United States Patent
Li et al.

(10) Patent No.: US 12,494,269 B2
(45) Date of Patent: Dec. 9, 2025

(54) STRUCTURED DATA GENERATION METHOD AND APPARATUS, DEVICE, MEDIUM, AND PROGRAM PRODUCT

(71) Applicant: TENCENT TECHNOLOGY (SHENZHEN) COMPANY LIMITED, Guangdong (CN)

(72) Inventors: Lanqing Li, Shenzhen (CN); Ziqi Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 387 days.

(21) Appl. No.: 18/333,140

(22) Filed: Jun. 12, 2023

(65) Prior Publication Data

US 2023/0335229 A1 Oct. 19, 2023

Related U.S. Application Data

(63) Continuation of application No. PCT/CN2022/136450, filed on Dec. 5, 2022.

(30) Foreign Application Priority Data

Feb. 17, 2022 (CN) .......................... 202210146218.2

(51) Int. Cl.
*G16C 20/50* (2019.01)
*G16C 20/70* (2019.01)
(52) U.S. Cl.
CPC .............. *G16C 20/50* (2019.02); *G16C 20/70* (2019.02)

(58) Field of Classification Search
None
See application file for complete search history.

(56) References Cited

U.S. PATENT DOCUMENTS 11,188,813 B2 * 11/2021 Goudarzi ............... G06N 3/045
11,227,190 B1    1/2022 Li et al.
(Continued)

FOREIGN PATENT DOCUMENTS

CN    110263780 A    9/2019
CN    111178507 A    5/2020
(Continued)

OTHER PUBLICATIONS

T. J. Draelos et al., "Neurogenesis deep learning: Extending deep networks to accommodate new classes," 2017 International Joint Conference on Neural Networks (IJCNN), Anchorage, AK, USA, 2017, pp. 526-533, (Year: 2017).*

(Continued)

*Primary Examiner* — Daniel F. McMahon
(74) *Attorney, Agent, or Firm* — Sughrue Mion, PLLC

(57) ABSTRACT

Disclosed are a structured data generation method and apparatus that can acquire a structure feature representation and a node feature representation of sample structured data; generate a hidden-layer feature representation based on the structure feature representation and the node feature representation; input the hidden-layer feature representation into a to-be-trained decoder for structure reconstruction to obtain predicted structured data; and train the to-be-trained decoder based on the predicted structured data to obtain a specified decoder, the specified decoder being configured to perform structure reconstruction on inputted sampled data to obtain reconstructed structured data.

20 Claims, 8 Drawing Sheets

(56) References Cited

U.S. PATENT DOCUMENTS

| | | | |
|---|---|---|---|
| 11,263,534 B1* | 3/2022 | Prat | G06F 16/951 |
| 12,020,154 B2* | 6/2024 | Yang | G06N 3/0455 |
| 2022/0188652 A1* | 6/2022 | Pabrinkis | G06V 10/82 |
| 2022/0284259 A1* | 9/2022 | Brambila | G06N 3/04 |
| 2023/0075100 A1* | 3/2023 | Zavoronkovs | G06N 3/006 |
| 2023/0290114 A1* | 9/2023 | Prat | G16B 40/00 |

FOREIGN PATENT DOCUMENTS

| | | |
|---|---|---|
| CN | 112819154 A | 5/2021 |
| CN | 113609337 A | 11/2021 |
| CN | 114510609 A | 5/2022 |

OTHER PUBLICATIONS

Emmanuel Noutahi et al: "Towards Interpretable Sparse Graph Representation Learning with Laplacian Pooling", arxiv.org, Cornell University Library, 201 Olin Library Cornell University Ithaca, NY 14853, May 28, 2019 (May 28, 2019), XP081623530.

Communication from European Patent Office dated Apr. 28, 2025 in Application No. 22926850.3.

International Search Report for PCT/CN2022/136450 dated, Feb. 14, 2023 (PCT/ISA/210).

Written Opinion of the International Searching Authority for PCT/CN2022/136450 dated, Feb. 14, 2023 (PCT/ISA/237).

\* cited by examiner

STRUCTURED DATA GENERATION METHOD AND APPARATUS, DEVICE, MEDIUM, AND PROGRAM PRODUCT

CROSS-REFERENCE TO RELATED APPLICATION

This application is a continuation of International Application No. PCT/CN2022/136450 filed on Dec. 5, 2022 and claims priority to Chinese Patent Application No. 202210146218.2, filed with the China National Intellectual Property Administration on Feb. 17, 2022 the disclosure of both being incorporated herein by reference in their entireties.

FIELD

Embodiments of the disclosure relate to the field of computer technologies, and in particular, to a structured data generation method and apparatus, a device, a medium, and a program product.

BACKGROUND

With the development of artificial intelligence (AI), AI is applied in more and more fields, and particularly, in the smart healthcare field, AI may drive drug discovery and assist professionals in the development of new drugs.

In a related technology, chemical molecule structures may be mapped to generate molecular graphs of corresponding graph structures, these molecular graphs are learned based on a message propagation process through a graph convolutional network (GCN), new feature representations are generated through the GCN, and during decision, new structures corresponding to the new feature representations are added to the existing graphs in a form that conforms to organic molecular chemistry rules to obtain molecular graphs corresponding to new molecules.

However, during structure generation of the foregoing new molecules, due to the low-pass characteristics of the GCN, graph data characterizing a molecule is smoothed, so that a complete original signal cannot be reconstructed during decoding, the diversity and validity of generated molecules are insufficient, and the generation efficiency is low.

SUMMARY

Embodiments of the disclosure provide a structured data generation method and apparatus, a device, a medium, and a program product, which may improve the generation efficiency of a specified structure and the diversity of generated structures. Technical solutions will be described below.

In some embodiments, a structured data generation method is provided, which includes:
  acquiring a structure feature representation and a node feature representation of sample structured data, the structure feature representation indicates the connection between nodes constituting the sample structured data, and the node feature representation indicates node types corresponding to the nodes constituting the sample structured data;
  generating a hidden-layer feature representation based on the structure feature representation and the node feature representation, the hidden-layer feature representation indicates the combination of the nodes in the sample structured data on at least two frequency bands;
  inputting the hidden-layer feature representation into a to-be-trained decoder for structure reconstruction to obtain predicted structured data; and
  training the to-be-trained decoder based on the predicted structured data to obtain a specified decoder, the specified decoder being configured to perform structure reconstruction on inputted sampled data to obtain reconstructed structured data, and the sampled data being data obtained by sampling candidate data.

In another aspect, a structured data generation apparatus is provided, which includes:
  an acquisition module, configured to acquire a structure feature representation and a node feature representation of sample structured data, the structure feature representation indicates the connection between nodes constituting the sample structured data, and the node feature representation indicates node types corresponding to the nodes constituting the sample structured data;
  an encoding module, configured to generate a hidden-layer feature representation based on the structure feature representation and the node feature representation, the hidden-layer feature representation indicates the combination of the nodes in the sample structured data on at least two frequency bands;
  a decoding module, configured to input the hidden-layer feature representation into a to-be-trained decoder for structure reconstruction to obtain predicted structured data; and
  a training module, configured to train the to-be-trained decoder based on the predicted structured data to obtain a specified decoder, the specified decoder being configured to perform structure reconstruction on inputted sampled data to obtain reconstructed structured data, and the sampled data being data obtained by sampling candidate data.

In some embodiments, a computer device is provided, which includes a processor and a memory. The memory stores at least one instruction, at least one piece of program, a coda set or an instruction set, and the at least one instruction, the at least one piece of program, the code set or instruction set is loaded and executed by the processor to implement the structured data generation method according to any one of the embodiments of the disclosure.

In some embodiments, a non-transitory computer-readable storage medium is provided, which stores at least one piece of program code that, when loaded and executed by a processor, implements the structured data generation method according to any one of the embodiments of the disclosure.

In some embodiments, a computer program product or a computer program is provided, which includes computer instructions. The computer instructions are stored in a computer-readable storage medium. A processor of a computer device reads the computer instructions from the computer-readable storage medium and executes the computer instructions to cause the computer device to perform the structured data generation method according to any one of the foregoing embodiments.

The technical solutions provided in the disclosure include at least the following beneficial effects.

A hidden-layer feature representation is obtained according to a structure feature representation and a node feature representation corresponding to sample structured data, a to-be-trained decoder is iteratively trained according to the hidden-layer feature representation to obtain a specified decoder, and sampled data is inputted into the specified decoder to obtain required structured data. That is, diverse reconstructed structured data may be rapidly generated through the specified decoder obtained by training according to requirements, so that the generation efficiency and generation diversity of structured data are improved.

DESCRIPTION OF EMBODIMENTS

Figure 1:
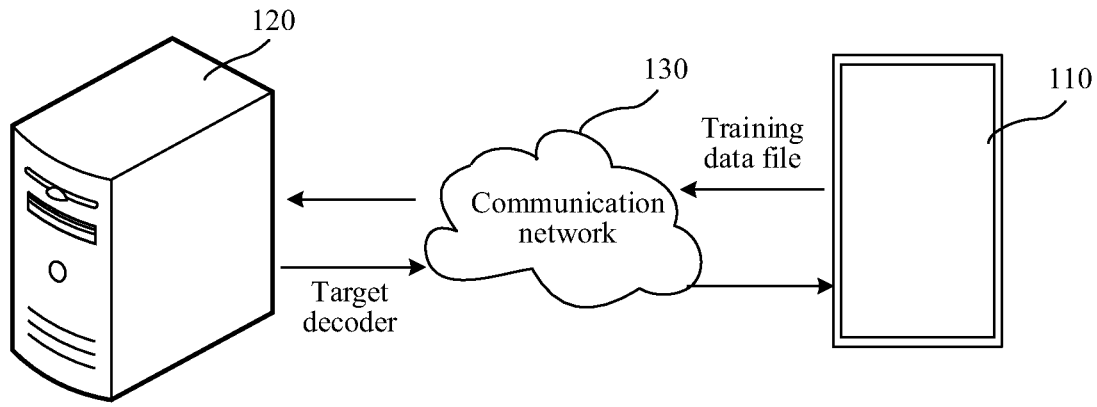
FIG. 1 is a schematic diagram of an implementation environment according to an embodiment of the disclosure.

First, terms involved in the embodiments of the disclosure are briefly introduced.

Artificial intelligence: a theory, method, technology, and application system that uses digital computers or machines controlled by digital computers to simulate, extend, and expand human intelligence, perceive the environment, acquire knowledge, and use knowledge to obtain the best results. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include a computer vision technology, a speech processing technology, a natural language processing technology, and several major directions such as machine learning/deep learning, automatic driving, and smart transport.

Machine learning (ML) is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

Graph convolutional network: a convolutional neural network that adopts a local sensing field, shared weights, and downsampling in a spatial domain, has stable and unchangeable characteristics relative to displacement, scaling, and distortion, and can well extract spatial features of an image. A graph structure does not have the translation invariance of a picture, and a conventional convolution method is not suitable for the graph structure. Therefore, the important difficulty of graph convolution is that quantities of neighborhood nodes of nodes in a graph are not the same, and features cannot be extracted by using convolution kernels with the same size. The GCN completes the integration of neighborhood information through the message passing mechanism of a spatial domain or a spectral domain, and extracts main features, and the most commonly used GCN is to perform low-pass filtering on a graph signal.

Wavelet transform: a localized analysis of spatial frequency, which gradually performs multi-scale refinement on signals through scaling and translation operations to finally achieve frequency domain subdivision. It can automatically adapt to the requirements of time frequency signal analysis, so that it can focus on any details of signals and solve difficult problems of Fourier transform.

Variational auto-encoder (VAE): a deep learning model oriented to data generation, First, inputted data is compressed and encoded, then, a hidden variable is generated by calculation, and finally, the decoder recovers the original data. During generation of data, the decoder may generate data in a distribution similar to that of the original data by only sampling the hidden variable according to a specified distribution. The application of a VAE model in molecule generation aims to generate effective molecules with consistent properties with reference molecules, which are used for high-quality drug discovery.

In the embodiments of the disclosure, machine learning/deep learning in the artificial intelligence technology is applied to structured data generation having certain law or satisfying certain rules.

Second, application scenarios of a structured data generation method according to the embodiments of the disclosure are illustrated.

I. The method may be applied to a chemical molecule generation scenario in the smart healthcare scene. In the smart healthcare scene, the method assists in the discovery and development of new drugs through AI, such as generation of lead drugs and drug optimization. The foregoing lead drug refers to a compound drug with a certain activity and chemical structure that is obtained by a certain way and means, which is used for further structure transformation and modification, and is the starting point of new drug research. The drug optimization refers to optimization performed on chemical structure of drugs according to certain rules to improve physical and chemical properties of the drugs.

In a related technology, a chemical molecule of a compound is mapped to a molecule graph of a graph structure, feature extraction is performed through a graph convolutional network (GCN), and structure recovery is performed through the GCN. That is, an intermediate feature Z=GCN (X, A) is extracted, where, X is a node feature of the molecule graph, and A is a side feature of the molecule graph, and then X̂=GCN (Ã, Z) is generated, where, Ã is a feature obtained by performing a specified transform on A. However, during implementation of this method, the interpretability of the decoding method used for generation of new molecules is poor, and there is no decoupling principle dual to the encoding part. Therefore, secondary smoothing is performed on graph signals, the diversity of generated molecule graphs is low, and the generation efficiency is low.

Exemplarily, according to the structured data generation method provided in the embodiments of the disclosure, a specified decoder is obtained by learning a chemical molecule structure of an existing drug. A decoding process is dual to an encoding process, so that high-quality clinical candidate molecules are efficiently and validly generated through the specified decoder during development of new drugs to assist in the development of new drugs. Or, the method is applied to screening of drug-like molecules with strong potential activity for known targets. The drug-like molecule refers to that a compound corresponding to the molecule has a certain similarity with a known drug, and the drug-like molecules have the possibility of becoming drugs. According to the structured data generation method provided in the embodiments of the disclosure, ideal candidate molecules are generated at a high success rate for targets for which drugs is difficult to develop.

II. The method may be applied to knowledge graph mining and construction scenarios The foregoing knowledge graph is composed of some interconnected entities and their attributes, and is a modern theory that combines the theories and methods of disciplines, such as applied mathematics, graphics, information visualization technology, and information science, with methods such as metrology citation analysis and co-occurrence analysis, and uses visual graphs to vividly display core structures of disciplines, frontier fields, and an overall knowledge architecture to achieve multi-disciplinary integration. Specifically, for example, the knowledge graph is a medical knowledge graph in the smart healthcare scene. Exemplarily, training is performed by taking a constructed knowledge graph corresponding to disease symptoms as training data to obtain a specified decoder, and multiple knowledge graphs with certain validity are efficiently generated through the specified decoder.

III. The method may be applied to a smart tourist automatic planning scenario. Exemplarily, according to the structured data generation method provided in the embodiments of the disclosure, training is performed according to a tourist route planning graph used for training to obtain a specified decoder, and a user may generate diverse planned tourist routes through the specified decoder. That is, diverse planned tourist routes may be provided for the user under specified conditions or random conditions to enrich smart travel. The foregoing specified conditions may be specified tourist cities, specified tourist attraction types, or the like.

Exemplarily, the foregoing scenarios are only examples of the application scenarios of the structured data generation method according to the embodiments of the disclosure, and the method may also be applied to scenarios where information can be processed into data of graph structures, such as a recommendation system based on a social relationship between users, text semantic analysis, and road condition prediction, and specific application scenarios are not defined here.

An implementation environment of the embodiments of the disclosure is described with reference to the explanation of the foregoing terms and the description of the application scenarios. As shown in FIG. 1, a computer system of the implementation environment includes: a terminal device 110, a server 120, and a communication network 130.

The terminal device 110 includes various types of devices such as a mobile phone, a tablet computer, a desktop computer, a portable notebook computer, a smart household appliance, an on-board terminal, and an aircraft. Exemplarily, a user instructs the server 120 through the terminal device 110 to train a to-be-trained decoder.

The server 120 is configured to provide a function of training the to-be-trained decoder, that is, the server 120 may invoke a corresponding operation module according to a request of the terminal device 110 to train a specified to-be-trained decoder. In some embodiments, a model architecture corresponding to the to-be-trained decoder may be pre-stored in the server 120, or may be uploaded by the terminal device 110 through a model data file. A training data set used for training the to-be-trained decoder may be pre-stored in the server 120, or may be uploaded by the terminal device 110 through a training data file. In one example, the user uploads a data set corresponding to sample structured data to the server 120 through the terminal device 110, and transmits a training request for the to-be-trained decoder. The training request carries a model identity document (ID) of the to-be-trained decoder. The server 120 reads the model architecture of the to-be-trained decoder corresponding to the model ID from database according to the model ID in the training request, and trains the to-be-trained decoder according to the received data set.

During training, the server 120 obtains a hidden-layer feature representation according to a structure feature representation and a node feature representation of sample structured data, and trains the to-be-trained decoder based on the hidden-layer feature representation to obtain a specified decoder. After the specified decoder is obtained by the server 120 by training, the server 120 may transmit the specified decoder to the terminal device 110, or arrange the specified decoder in an application module that is invoked by the terminal device 110 through a data generation request.

In some embodiments, if the computing power of the terminal device 110 satisfies the training process of the foregoing to-be-trained decoder, the whole training process of the foregoing specified decoder may also be implemented by the terminal device 110 alone.

It is worthwhile to note that the forgoing server 120 may be an independent physical server, or may be a server cluster or a distributed system composed of multiple physical servers, or may be a cloud server providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform.

Cloud technology refers to a hosting technology that unifies a series of resources such as hardware, software, and network in a wide area network or a local area network to realize computation, storage, processing, and sharing of data.

In some embodiments, the foregoing server 120 may be further implemented as a node in a blockchain system.

Exemplarily, the terminal device 110 is connected to the server 120 through the communication network 130. The communication network 130 may be a wired network or a wireless network, which is not defined here.

Figure 2:
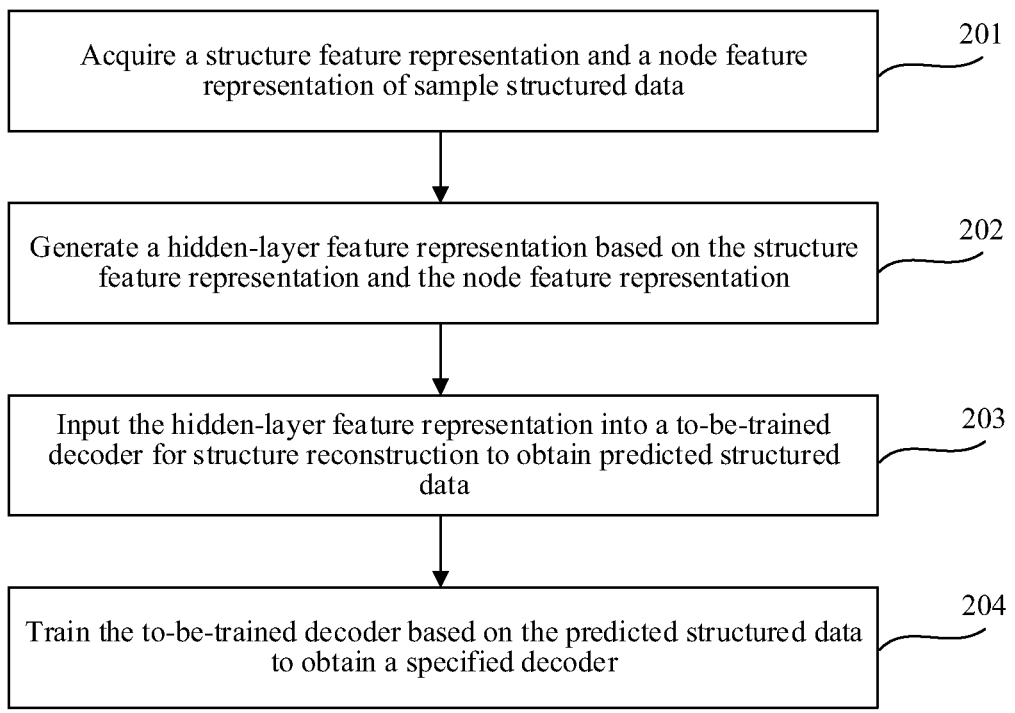
FIG. 2 is a flowchart of a structured data generation method according to an embodiment of the disclosure.

Referring to FIG. 2, which shows a structured data generation method according to some embodiments of the disclosure, in the embodiments of the disclosure, the method is performed by a computer device that is implemented as the terminal device or the server shown in FIG. 1. In one example, the method is applied to the server shown in FIG. 1 and includes the following operations.

Operation 201: Acquire a structure feature representation and a node feature representation of sample structured data.

The foregoing structure feature representation is used for indicating the connection between nodes constituting the sample structured data, and the node feature representation is used for indicating node types corresponding to the nodes constituting the sample structured data.

Exemplarily, the forgoing sample structured data is training data used for training a to-be-trained decoder and is data whose data structure is a graph structure, that is, the sample structured data is data composed of at least two nodes and at least one side. In some embodiments, the foregoing graph structure may be any graph structure such as an undirected graph, a directed graph, an undirected complete graph, and a directed complete graph, and a specific graph structure may be determined according to data information corresponding to the sample structured data. For example, based on a chemical molecule needing to be represented by a graph structure, that is, the sample structured data corresponds to a chemical molecule, atoms in the molecule are nodes in a graph, and chemical bonds between the atoms are sides in the graph. Because the sides do not need to indicate directions, correspondingly an undirected graph may be used as a data structure corresponding to the sample structured data.

The structure feature representation is used for indicating the connection between the nodes in the graph corresponding to the sample structured data, and the connection is associated with a structure generation task corresponding to the sample structured data. For example, based on the structure generation task being generation of a chemical molecule, the connection relationship between the foregoing nodes may be chemical bonds between atoms in the chemical molecule. Based on the structure generation task being a recommendation system based on a social network, the connection between the nodes may be an interactive relationship (such as a stranger relationship, a friend relationship, and a blacklist relationship) between users in the social network. Based on the structure generation task being generation of a tourist route, the connection between the nodes may be distances between tourist attractions.

The node feature representation may be used for indicating node types of the nodes in the graph corresponding to the sample structured data, and the node types are associated with the structure generation task corresponding to the sample structured data. For example, based on the structure generation task being generation of a chemical molecule, the foregoing node types are types of atoms in the chemical molecule. Based on the structure generation task being a recommendation system based on a social network, the node types are user accounts in the social network. Based on the structure generation task being generation of a tourist route, the node types are tourist attractions.

Exemplarily, the structure feature representation and the node feature representation of the sample structured data are obtained by transforming the sample structured data in a preset feature transformation manner. In some embodiments, the foregoing structure feature representation may be a feature representation in the form of a matrix or in the form of a vector, and the foregoing node feature representation may be a feature representation in the form of a matrix or in the form of a vector, which is not defined here.

In some embodiments, the foregoing preset transformation manner may be a network transformation manner, that is, the foregoing structure feature representation and node feature representation may be obtained by feature extraction through a feature extraction network. The sample structured data may be inputted into a pre-trained feature extraction network, and the structure feature representation and a node feature representation are outputted. The foregoing feature extraction network may be a network capable of performing feature extraction, such as a convolutional neural network (CNN), a visual geometry group network (VGGNet), and an Alex network (AlexNet), which is not defined here.

In some embodiments, the foregoing preset transformation manner may be a matrix transformation manner, that is, the foregoing structure feature representation and node feature representation may be obtained by performing matrix transformation on graph structured data corresponding to the sample structured data. Exemplarily, a logical structure of the sample structured data of the foregoing graph structure may be divided into two parts, which are a node set composed of at least two nodes and a side set composed of sides between the nodes. The foregoing structure feature representation may be two-dimensional data that may be generated according to the side set and used for storing the sides, that is, an adjacency matrix used for recording the connection of the foregoing at least two nodes. The foregoing node feature representation may be a one-dimensional matrix (array) that may be generated according to the node set and used for storing node data in the graph.

In one example, the sample structured data may be used for indicating a chemical molecule, the foregoing adjacency matrix records types of chemical bonds between atoms in the chemical molecule, the node feature representation may be a one-dimensional feature matrix that may be generated according to the atoms constituting the chemical molecule and used for recording types of the atoms in the chemical molecule. Exemplarily, a sample chemical molecule may be acquired, which may be composed of at least two atoms and may be a known molecule satisfying the atom bonding criteria. The sample chemical molecule may be transformed into a sample molecule graph whose data structure may be a graph structure. Nodes in the sample molecule graph are used for representing the at least two atoms in the sample chemical molecule, such as carbon atoms, hydrogen atoms, and oxygen atoms, and sides in the sample molecule graph are used for representing chemical bonds between the atoms in the sample chemical molecule. The foregoing chemical bonds include none, a single bond, a double bond, a triple bond, and other types of chemical bonds. In a computer, the atom types and the chemical bond types may be mapped to different characters or character strings according to a specified mapping relationship. For example, the none corresponds to "0", the single bond corresponds to "1", the double bond corresponds to "2", and the triple bond corresponds to "3". The foregoing mapping relationship may be recorded in a preset mapping table. An adjacency matrix corresponding to the sample molecule graph may be determined as the structure feature representation, and a node matrix corresponding to the sample molecule graph may be determined as the node feature representation. The molecule graph of the graph structure can simply and clearly represent a connection relationship between an atom and an atom in the chemical molecule, so the acquisition efficiency of the sample molecule graph can be improved. Moreover, during feature extraction, features of the atom types and the features of the chemical bonds between the atoms are retained.

In the embodiments of the disclosure, the foregoing to-be-trained decoder may be a part of a training model. Exemplarily, the structure feature representation and the node feature representation corresponding to the sample structured data are inputted into the training model to output predicted structured data, and the whole training model may be trained according to a deviation between the predicted structured data and the sample structured data, that is, the training of the to-be-trained decoder may be completed in the whole training process of the training model.

Operation 202: Generate a hidden-layer feature representation based on the structure feature representation and the node feature representation.

The foregoing hidden-layer feature representation may be used for indicating the combination of the nodes in the sample structured data on at least two frequency bands.

Exemplarily, the foregoing training model further includes a to-be-trained encoder configured to generate the hidden-layer feature representation based on the structure feature representation and the node feature representation. In some embodiments, an encoder structure corresponding to the foregoing to-be-trained encoder may be an auto-encoder, a variational auto-encoder (VAE), a low-pass filter, a band-pass filter, or the like. A specifically used filter may be a convolutional neural network, a wavelet filter, a Butterworth filter, a Bessel filter, or the like, which is not defined here.

In the embodiments of the disclosure, based on the sample structured data being data of a graph structure, the foregoing to-be-trained encoder may be a GCN, that is, the structure feature representation and the node feature representation are taken as an input of the GCN to output the foregoing hidden-layer feature representation.

Exemplarily, the foregoing hidden-layer feature representation may be used for indicating the combination of the nodes in the sample structured data on at least two frequency bands, so in the embodiments of the disclosure, the GCN includes a first filtering layer and at least two second filtering layer.

In some embodiments, the foregoing first filtering layer may be configured to perform low-pass filtering, high-pass filtering, or band-pass filtering, which may be specifically determined according to the requirements of actual application scenarios. In one example, the application scenario may be a scenario where a chemical molecule is generated, and the foregoing first filtering layer may be a low-pass GCN layer. The foregoing first filtering layer is only indicative of filtering layers with the same function, and may be composed of a single filtering layer or multiple filtering layers. For example, the first filtering layer includes two low-pass GCN layers, that is, may be composed of two layers of neurons, which is not defined here.

The foregoing second filtering layers are band-pass filtering layers corresponding to the at least two frequency bands. Exemplarily, data outputted by the first filtering layer may be inputted into the foregoing at least two second filtering layers to output a filtering result corresponding to each frequency band. Exemplarily, a quantity of the second filtering layers corresponds to a quantity of divided frequency bands. The foregoing second filtering layers are only indicative of filtering layers with the same function. The at least two second filtering layers are at least two second filtering layers connected in parallel, and a single second filtering layer may be composed of a single filtering layer or multiple filtering layers, which is not defined here.

Exemplarily, the structure feature representation and the node feature representation are respectively encoded on the at least two frequency bands to obtain intermediate feature data used for indicating the combination of the nodes in the sample structured data on the corresponding frequency bands, and the intermediate feature data respectively corresponding to the at least two frequency bands may be aggregated based on a specified data distribution to obtain the hidden-layer feature representation. That is, the intermediate feature data on the at least two frequency bands may be obtained through the foregoing first filtering layer and second filtering layers, and may be aggregated to obtain the hidden-layer feature representation.

In some embodiments, an aggregation manner of the foregoing intermediate feature data may be that the intermediate feature data may be spliced together according to a frequency band order of the at least two frequency bands. In one example, the foregoing frequency band order may be an order in which the at least two frequency bands are sorted from low to high. Or, the aggregation manner of the foregoing intermediate feature data may be that the intermediate feature data respectively corresponding to the at least two frequency bands may be fitted according to the specified data distribution. For example, the intermediate feature data may be fitted according to a normal distribution (Gaussian distribution), the Chebyshev polynomials, least squares, or the like. In some embodiments, if the quantity of nodes in the sample structured data is small, that is, the computing power may satisfy the computing requirements of the structure matrix and the feature matrix, the polynomial fitting may be replaced with eigenvalue decomposition, that is, eigen decomposition may be performed on a Laplacian matrix.

Operation 203: Input the hidden-layer feature representation into a to-be-trained decoder for structure reconstruction to obtain predicted structured data.

Exemplarily, structure reconstruction may be performed on the hidden-layer feature representation through the decoder to obtain the predicted structured data. In some embodiments, an output of the to-be-trained decoder may be a decoded structure feature representation and a decoded node feature representation. That is, the hidden-layer feature representation may be sampled through the to-be-trained decoder to acquire the decoded structure feature representation and the decoded node feature representation, and the predicted structured data may be generated based on the decoded structure feature representation and the decoded node feature representation. The foregoing decoded structure feature representation may be used for indicating a relationship between nodes in the predicted structured data, and the decoded node feature representation may be used for indicating the nodes in the predicted structured data.

Figure 3:
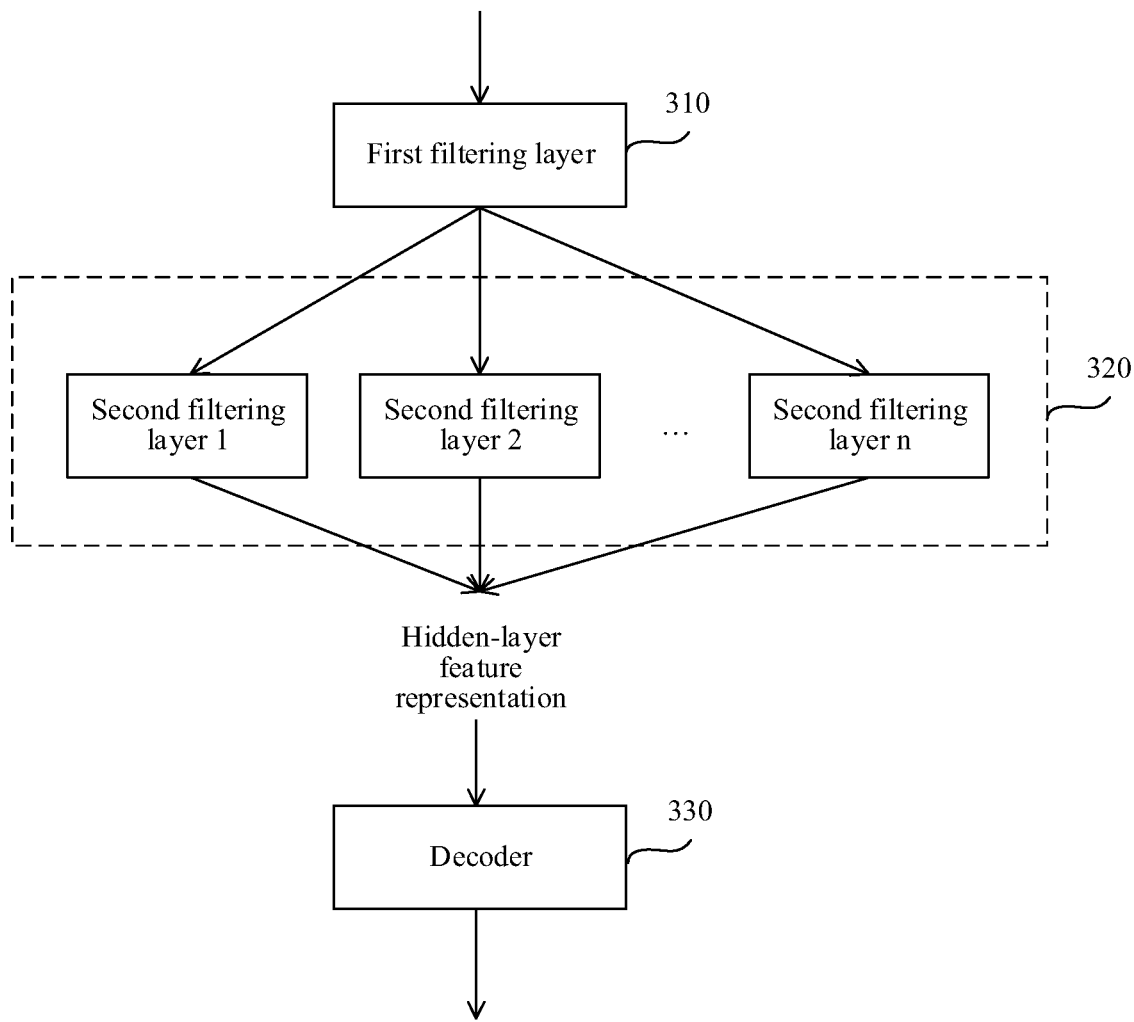
FIG. 3 is a schematic structural diagram of a model according to an embodiment of the disclosure.

In one example, as shown in FIG. 3, which is a schematic structural diagram of a model according to an embodiment of the disclosure, the structure feature representation and the node feature representation of the sample structured data are inputted into a first filtering layer 310, an output result of the first filtering layer 310 may be inputted into a second filtering layer 320, an output of the second filtering layer 320 may be aggregated to obtain the hidden-layer feature representation, the hidden-layer feature representation may be decoded by a decoder 330 to obtain a decoding result, and the decoding result may be the foregoing decoded structure feature representation and decoded node feature representation.

Operation 204: Train the to-be-trained decoder based on the predicted structured data to obtain a specified decoder.

The specified decoder may be configured to perform structure reconstruction on inputted sampled data to obtain reconstructed structured data, and the sampled data may be data obtained by sampling candidate data. In some embodiments, the foregoing candidate data may be data satisfying a specified data distribution.

In the embodiments of the disclosure, the to-be-trained decoder may be trained according to a structure difference between the predicted structured data outputted by the to-be-trained decoder and the inputted sample structured data until the to-be-trained decoder converges. In some embodiments, the to-be-trained decoder may be a part of the training model, so the training of the to-be-trained decoder may be dependent on the whole training process of the training model. That is, the training model may be trained according to the structure difference between the predicted structured data and the inputted sample structured data to obtain a convergent prediction model, and a decoder part may be separated from the prediction model as the foregoing specified decoder and configured to generate reconstructed structured data.

Exemplarily, a training loss value may be obtained based on the structure difference between the sample structured data and the predicted structured data, and it may be determined that the training of the to-be-trained decoder may be completed in response to the training loss value reaching a specified loss threshold, that is, it may be determined that the model may be trained to be convergent, to obtain the specified decoder. Or, model parameters of the to-be-trained decoder may be iteratively trained, that is, iterative training may be performed by adjusting model parameters of the training model, in response to a matching failure of the training loss value and the specified loss threshold. The foregoing specified loss threshold may be preset by a system, or may be customized according to user needs. For example, when the required model accuracy is higher, a corresponding specified loss threshold may be smaller.

The foregoing training loss value may be calculated according to a specified loss function, which may be a loss function used for regression, reconstruction, and classification. In some embodiments, the specified loss function may be a loss function such as a mean absolute error loss function, a negative log-likelihood loss function, an exponential loss function, a cross-entropy loss function, or a variant thereof, which is not defined here.

Based on the above, according to the structured data generation method provided in the embodiments of the disclosure, a hidden-layer feature representation may be obtained according to a structure feature representation and a node feature representation corresponding to sample structured data, a to-be-trained decoder may be iteratively trained according to the hidden-layer feature representation to obtain a specified decoder, and sampled data may be inputted into the specified decoder to generate required structured data. That is, diverse reconstructed structured data may be rapidly generated through the specified decoder obtained by training according to requirements, so that the generation efficiency and generation diversity of structured data are improved.

Figure 4:
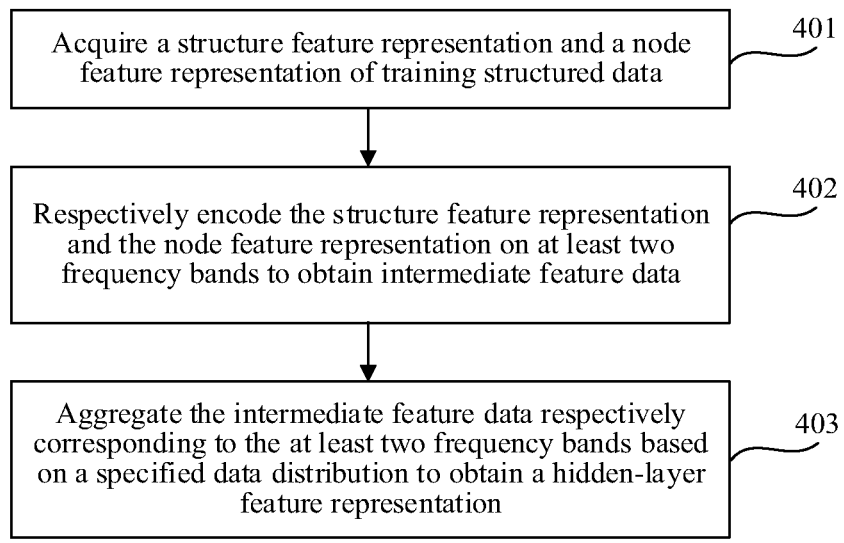
FIG. 4 is a flowchart of a hidden-layer feature representation generation method according to an embodiment of the disclosure.

Referring to FIG. 4, which shows a hidden-layer feature representation generation method according to some embodiments of the disclosure, and in the embodiments of the disclosure, a process of acquiring a hidden-layer feature representation through an encoder is described. The method includes the following operations.

Operation 401: Acquire a structure feature representation and a node feature representation of sample structured data.

In the embodiments of the disclosure, a whole training model includes an encoder part for inference and a decoder part for generation, and the structure feature representation and the node feature representation of the sample structured data are an input of the whole training model.

The foregoing structure feature representation is used for indicating the connection between nodes constituting the sample structured data, and the node feature representation is used for indicating node types corresponding to the nodes constituting the sample structured data. The foregoing sample structured data may be training data used for training the training model and may be data whose data structure is a graph structure.

Operation 402: Respectively encode the structure feature representation and the node feature representation on at least two frequency bands to obtain intermediate feature data.

In the embodiments of the disclosure, the structure feature representation and the node feature representation are encoded through a to-be-trained encoder in the training model to obtain the intermediate feature data. A structure of the to-be-trained encoder includes a first filtering layer and at least two filtering layers.

In some embodiments, the encoding process may be completed by wavelet transform, that is, the structure of the foregoing to-be-trained encoder may be a GCN. The first filtering layer may be a low-pass GCN layer, and the second filtering layers are band-pass wavelet layers. The at least two band-pass wavelet layers respectively correspond to different wavelet basis functions, that is, signals are filtered according to the wavelet basis functions. That is, with reference to the multi-scale principle in wavelet transform, Taylor expansion representations of different wavelet basis functions are taken as the basis for convolutional band-pass filtering, and the wavelet transform process is a convolution process of an inputted feature and a wavelet basis function.

Exemplarily, a scale calibration may be acquired according to a structure generation task that needs to be completed by the training model, and at least two corresponding basis functions are calculated according to the scale calibration. The at least two basis functions form a basis function group, and each basis function in the basis function group corresponds to one band-pass wavelet layer, that is, corresponds to one frequency band.

Operation 403: Aggregate the intermediate feature data respectively corresponding to the at least two frequency bands based on a specified data distribution to obtain a hidden-layer feature representation.

In some embodiments, outputs of the at least two band-pass wavelet layers are directly aggregated to obtain the hidden-layer feature representation. In this case, the intermediate feature data may be an encoding result obtained by the to-be-trained encoder. Exemplarily, the structure feature representation and the node feature representation are inputted into the to-be-trained encoder to output the intermediate feature data respectively corresponding to the at least two frequency bands, and the intermediate feature data may be aggregated to obtain the hidden-layer feature representation. That is, in the process of generating the hidden-layer feature representation according to the structure feature representation and the node feature representation, the intermediate feature data is generated through the to-be-trained encoder, and the to-be-trained encoder and a to-be-trained decoder are trained together, so that a training result is backpropagated during training of the model to assist in the training of the to-be-trained decoder.

An aggregation manner of the foregoing intermediate feature data may be that the intermediate feature data is spliced together according to a frequency band order of the at least two frequency bands. In one example, the foregoing frequency band order may be an order in which the at least two frequency bands are sorted from low to high.

Figure 5:
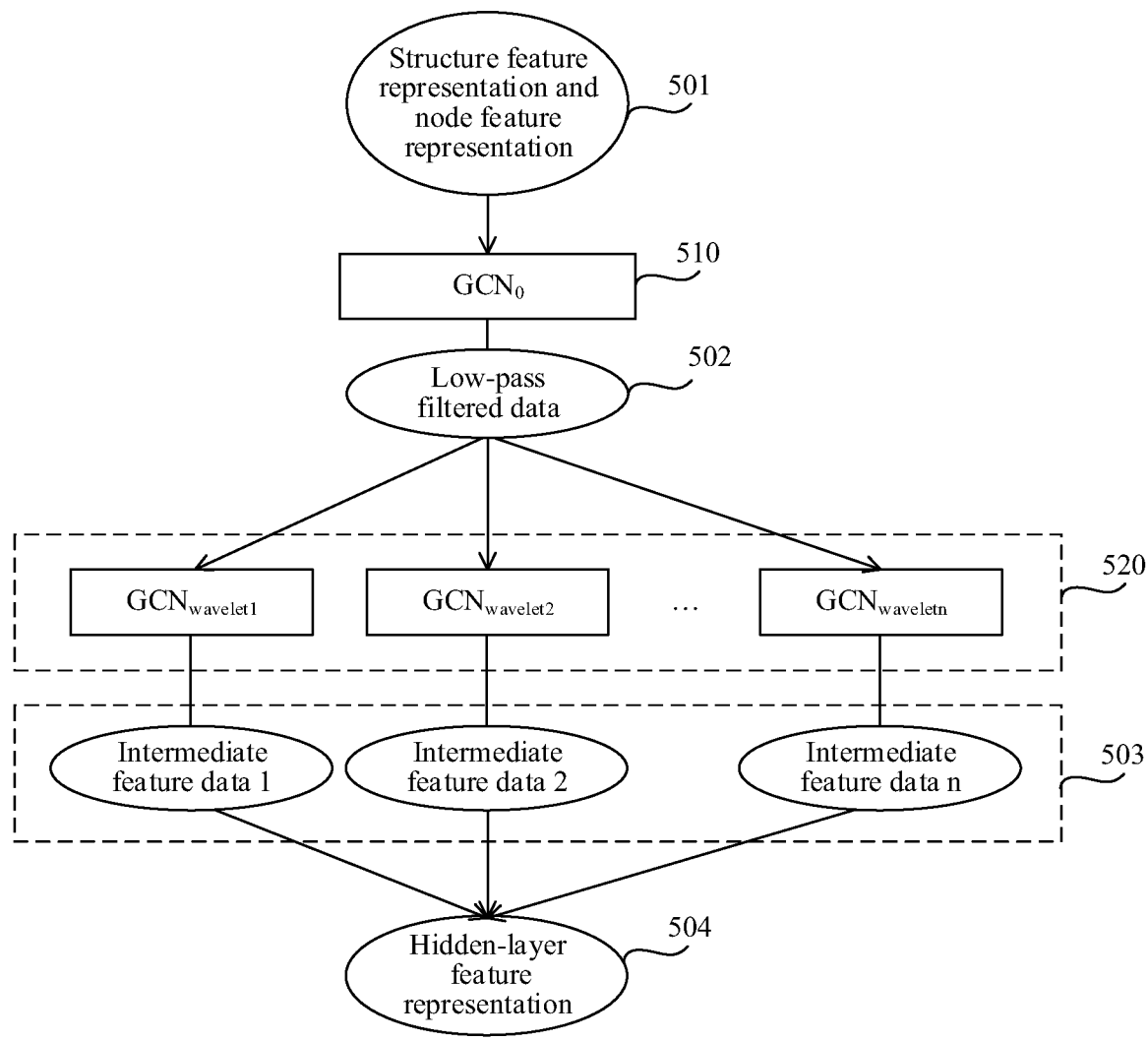
FIG. 5 is a schematic diagram of acquisition of a hidden-layer feature representation according to an embodiment of the disclosure.

Exemplarily, as shown in FIG. 5, which is a schematic diagram of acquisition of a hidden-layer feature representation according to an embodiment of the disclosure, a structure feature representation and a node feature representation 501 are inputted into $GCN_0$ 510 to obtain low-pass filtered data 502, the low-pass filtered data 502 is inputted into $GCN_{wavelet}$ 520 (including $GCN_{wavelet1}$, $GCN_{wavelet2}$, . . . , and $GCN_{waveletm}$), each $GCN_{wavelet}$ 520 outputs one piece of intermediate feature data 503, and the intermediate feature data 503 may be aggregated to obtain a hidden-layer feature representation Z 504.

In other embodiments, in order to indicate the diversity of reconstructed structured data generated by a specified decoder obtained by training, the intermediate feature data may be data obtained by performing intermediate computing on a feature encoded through the to-be-trained encoder.

In one example, the data obtained through intermediate computing may be a mean value and a variance. Exemplarily, node feature vectors in a feature space respectively corresponding to the nodes in the sample structured data on the at least two frequency bands are acquired based on the structure feature representation and the node feature representation, mean value data and variance data of the node feature vectors corresponding to the at least two frequency bands are acquired, and the mean value data and the variance data are determined as the intermediate feature data. That is, after filtering is performed through the to-be-trained encoder, a mean value and a variance of the node feature vectors corresponding to the frequency bands are calculated to obtain the mean value data and the variance data, and the foregoing mean value data and the variance data are the intermediate feature data used for generating the hidden-layer feature representation. That is, a variational inference process of variational self-encoding may be realized according to the mean value data and the variance data of the node feature vectors corresponding to different frequency bands, so that the interpretability of the specified decoder obtained by downstream training is improved, and the space for structured data generation is expanded.

Specifically, the to-be-trained encoder may be an encoder based on a probability model represented by formula I. In the formula, Z represents a hidden-layer feature representation of nodes, X is a feature matrix corresponding to a node feature representation, a dimension of X is N*1, N is a quantity of nodes in sample structured data and is a positive integer, and A is an adjacency matrix that corresponds to a structure feature representation and is used for storing sides between the nodes.

$q(Z|X,A)=\Pi_{i=1}^{N}q(z_i|X,A)$ (Formula I)

q($z_i$|X,A) in formula I is determined according to formula II, μ represents a mean value of a node vector representation, σ represents a variance of the node vector representation, diag( ) is a generated diagonal matrix. Formula II represents that a feature corresponding to a node $z_i$ is fitted to a Gaussian distribution.

$q(z_i|X,A)=N(z_i|\mu_i,diag(\sigma_i^2))$ (Formula II)

It can be seen from formula I and formula II that, based on the to-be-trained encoder taking the structure feature representation and the node feature representation as known conditions, connection probabilities of establishing connection relationships between an $i^{th}$ predicted node in a predicted node set and predicted nodes in the predicted node set are determined, a connection probability distribution corresponding to the $i^{th}$ predicted node is determined according to the connection probabilities of the $i^{th}$ predicted node and the predicted nodes, and the intermediate feature data (a distribution corresponding to the hidden-layer feature representation) respectively corresponding to the at least two frequency bands is determined according to a fusion result of connection probability distributions of all the predicted nodes in the predicted node set. The foregoing predicted nodes are used for constructing finally outputted predicted structured data. Exemplarily, each predicted node in the predicted node set corresponds to one connection probability distribution, and a distribution corresponding to a hidden-layer feature representation Z may be determined according to a distribution obtained by successively multiplying the connection probability distribution corresponding to each predicted node. In the embodiments of the disclosure, the at least two frequency bands respectively correspond to distributions of frequency-band hidden-layer feature representations, and the foregoing distributions of the frequency-band hidden-layer feature representations of different frequency bands may be fused to obtain the distribution corresponding to the hidden-layer feature representation.

A case where the structured data is a chemical molecule is taken as an example, a set of different types of chemical atoms is taken as the predicted node set, for an $i^{th}$ type of chemical atom, whether connection relationships between the $i^{th}$ type of chemical atom and all types of chemical atom including the $i^{th}$ type of chemical atom in the predicted node set can be established corresponds to a probability value for the establishment of the connection relationships, and when the connection relationships between the $i^{th}$ type of chemical atom and all types of chemical atoms in the set are synthetically observed, a distribution, corresponding to the foregoing probability value, of the $i^{th}$ type of chemical atom is formed, that is, the foregoing connection probability distribution. Each chemical atom corresponds to one connection probability distribution, which is fitted to a Gaussian distribution during training of the to-be-trained encoder. When the connection probability distributions of the nodes are fitted to Gaussian distributions, a distribution of the hidden-layer feature representation Z obtained by successively multiplying the connection probability distributions is also a Gaussian distribution.

Under the foregoing probability model, a GCN may be adopted for encoding to acquire mean value data and variance data. A single GCN is taken as an example, a computation representation of the single GCN is represented by formula III, and in the formula, A is a structure feature representation inputted into the GCN, X is a node feature representation inputted into the GCN, $W_0$ is a model parameter of a GCN model, $\tilde{A}=D^{-1/2}AD^{-1/2}$ and D is a degree matrix corresponding to sample structured data of a graph structure. In some embodiments, the mean value data and the variance data may be obtained through the single GCN or through multiple layers of GCNs, which is not defined here.

$$GCN(X,A)=\tilde{A}XW_0 \quad \text{(Formula III)}$$

After being obtained, the foregoing mean value data and variance data may be fitted according to a specified data distribution to obtain the hidden-layer feature representation. In one example, the foregoing specified data distribution is a Gaussian distribution.

Figure 6:
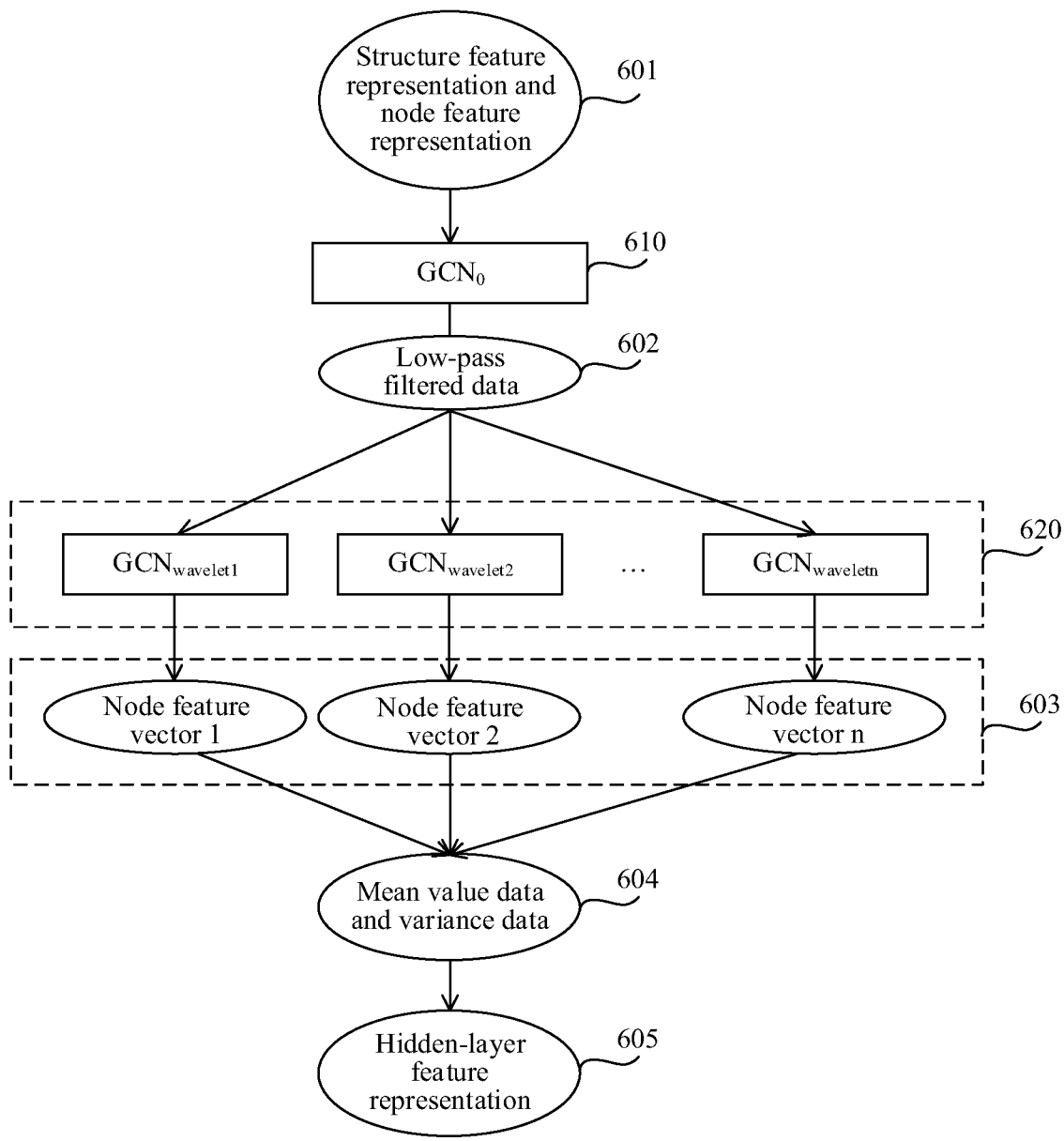
FIG. 6 is a schematic diagram of acquisition of a hidden-layer feature representation according to another embodiment of the disclosure.

Exemplarily, as shown in FIG. 6, which is a schematic diagram of acquisition of a hidden-layer feature representation according to another embodiment of the disclosure, a structure feature representation and a node feature representation 601 are inputted into $GCN_0$ 610 to obtain low-pass filtered data 602, the low-pass filtered data 602 is inputted into $GCN_{wavelet}$ 620 (including $GCN_{wavelet1}$, $GCN_{wavelet2}$, . . . , and $GCN_{waveletm}$), each $GCN_{wavelet}$ 620 outputs a corresponding node feature vector 603, mean value data and variance data 604 are obtained by performing intermediate computing on the node feature vector 603, the mean value data and the variance data 604 are taken as intermediate feature data, and the intermediate feature data is fitted to obtain a hidden-layer feature representation Z 605 of a Gaussian distribution.

In the embodiments of the disclosure, for $GCN_0$ shown in FIG. 6, a computation representation corresponding to $GCN_0$ is represented by formula III, that is, $GCN_0(X,A)=\tilde{A}XW_0$, a node feature representation X and a structure feature representation A are inputted into $GCN_0$ and transformed into $X_0$ according to an activation function, and an input of $GCN_{wavelet}$ is $X_0$ and A. A case where $GCN_{wavelet}$ includes $GCN_{wavelet1}$ and $GCN_{wavelet2}$ is taken as an example, $GCN_{wavelet1}(X_0,A)=A_{wavelet1}X_0W_1$, and $GCN_{wavelet2}(X_0,A)=A_{wavelet2}X_0W_2$, where, $W_1$ is a model parameter of $GCN_{wavelet1}$, $W_2$ is a model parameter of $GCN_{wavelet2}$, $A_{wavelet1}$ is a wavelet transform result of A according to a wavelet basis function corresponding to $GCN_{wavelet1}$, and $A_{wavelet2}$ is a wavelet transform result of A according to a wavelet basis function corresponding to $GCN_{wavelet2}$. The foregoing activation function may be a sigmoid activation function (a sigmoid growth curve), a tan h nonlinear function, a ReLU activation function, or a variant thereof, which is not defined here.

In one example, after the mean value data and the variance data are determined, and the hidden-layer feature representation is calculated by a reparameterization technique represented by formula IV, where, μ is the foregoing mean value data, σ is the foregoing variance data, and ε is a normal Gaussian distribution, that is, $p(ε)=N(0,I)$.

$$Z=\mu+\varepsilon*\sigma \quad \text{(Formula IV)}$$

Based on the above, according to the hidden-layer feature representation generation method provided in the embodiments of the disclosure, a structure feature representation and a node feature representation of sample structured data are filtered through a GCN to obtain intermediate feature data corresponding to multiple frequency bands, and the intermediate feature data is aggregated to obtain a hidden-layer feature representation. That is, a process of compressing and encoding a graph is realized based on wavelet transform. Multi-frequency domain refinement of the features is achieved by multi-scale refinement of features, and the focus is changed from the features to feature details respectively corresponding to multiple frequency domains, so that the diversity of generated reconstructed structured data is ensured. Moreover, the process of realizing encoding and prediction by using data of a graph structure ensures precision requirements for the data used for structure reconstruction.

Figure 7:
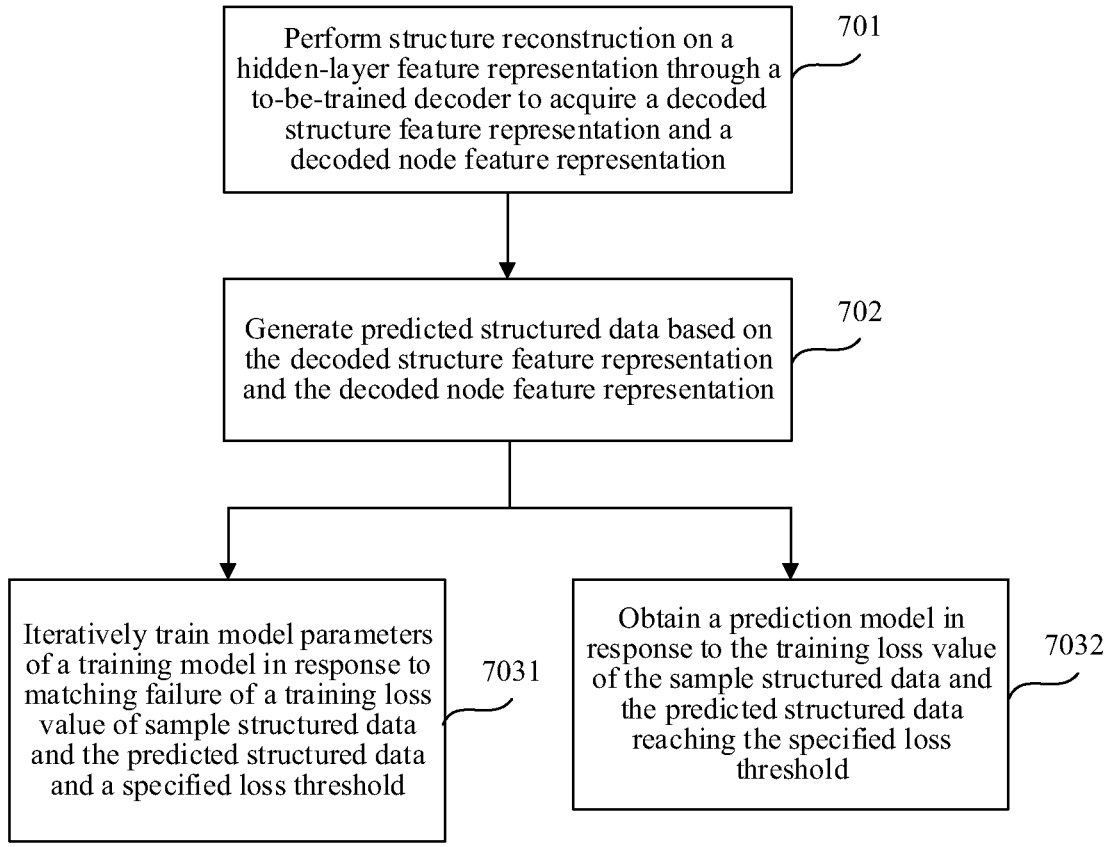
FIG. 7 is a flowchart of a decoder training method according to an embodiment of the disclosure.

Referring to FIG. 7, which shows a decoder training method according to some embodiments of the disclosure, and in the embodiments of the disclosure, a decoder part in a training network is described. Operation 701 to operation 703 (including 7031 and 7032) are performed after operation 403. The method includes the following operations.

Operation 701: Perform structure reconstruction on a hidden-layer feature representation through a to-be-trained decoder to acquire a decoded structure feature representation and a decoded node feature representation.

In the embodiments of the disclosure, a hidden-layer feature representation Z is an input of the to-be-trained decoder, and the to-be-trained decoder reconstructs the decoded structure feature representation and the decoded node feature representation according to probabilities of existence of sides between nodes during decoding. A probability model corresponding to the decoder is represented by formula V, where, N is a quantity of nodes, and $z_i$ and $z_j$ are respectively nodes in a hidden-layer feature representation $$p(A|Z)=\Pi_{i=1}^N\Pi_{j=1}^N p(A_{i,j}|z_i,z_j) \quad \text{(Formula V)}$$

$p(A_{i,j}|z_i,z_j)$ in formula V is obtained according to formula VI, where, sigmoid( ) represents an activation function (a sigmoid growth curve), and $z_i^T$ represents transposition for $z_i$. The foregoing used sigmoid activation function is only an example, and in an actual application, other activation function may be used, which is not defined here.

$$p(A_{i,j}|z_i,z_j)=sigmod(z_i^T z_j) \quad \text{(Formula VI)}$$

It can be seen from formula V and formula VI that obtained Â is represented by formula VII, where, Z is a hidden-layer feature representation, and σ( ) is, the same as sigmoid( ), an activation function.

$$\hat{A}=\sigma(ZZ^T) \quad \text{(Formula VII)}$$

In embodiments of the disclosure, the to-be-trained decoder reconstructs predicted structured data in compliance with the inverse transform theory for wavelet basis to obtain the decoded structure feature representation and the decoded node feature representation. The process of completing structure reconstruction through inverse wavelet transform may also be extended to other high-frequency basis functions such as a high-pass filtering and any wavelet basis without a generating function.

During decoding, it is necessary to discretize a scale in the wavelet transform process. In one example, an inverse transform representation of a kernel function g is defined as g−1, and an inverse function $g_1^{-1}$ under the condition of a=1, an inverse function $g_2^{-1}$ under the condition of a=2, and an inverse function $g_3^{-1}$ under the condition of a=3 are correspondingly solved, where, a is a scale in a wavelet basis function. Then, three-order Taylor expansion is performed on the three inverse functions to obtain inverse representation coefficients. The foregoing division of the scale (that is, a=1, 2, or 3) is an example, and in an actual application, the scale may be divided in a different manner, which is not defined here. The hidden-layer feature representation is convoluted according to the foregoing inverse representation coefficients to obtain the decoded structure feature representation and the decoded node feature representation.

Operation 702: Generate predicted structured data based on the decoded structure feature representation and the decoded node feature representation.

Exemplarily, after the decoded structure feature representation is obtained, the connection between nodes in predicted structured data may be known, after the decoded node feature representation is obtained, the nodes in the predicted structured data may be known, and the predicted structured data corresponding to a graph structure may be obtained according to the nodes and the connection between the nodes. The predicted structured data is used in the training process of a training model as an output result of training.

In one example, the decoded structure feature representation is implemented as an adjacency matrix obtained by decoding, and the decoded node feature representation is implemented as a node matrix obtained by decoding. The foregoing adjacency matrix is used for indicating adjacent relationships between the nodes, and the node matrix is used for indicating node types corresponding to the nodes in the predicted structured data. A matrix element in row i and column j in the adjacency matrix represents the connection between an $i^{th}$ node and a $j^{th}$ node. For example, based on the matrix element in row i and column j being 0, there is no side between the $i^{th}$ node and the $j^{th}$ node. The connection between nodes in the node matrix may be determined according to the foregoing adjacency matrix, and then the predicted structured data is generated.

Operation 7031: Iteratively train model parameters of the training model in response to matching failure of a training loss value of the sample structured data and the predicted structured data and a specified loss threshold.

Exemplarily, the training loss value is obtained based on a structure difference between the sample structured data and the predicted structured data. In the embodiments of the disclosure, during training, the training loss value is determined according to a distance measure between the generated predicted structured data and the originally inputted sample structured data and a divergence between a node distribution and a Gaussian distribution. That is, distance measure data of the sample structured data and the predicted structured data in a feature space is acquired, and divergence data of a node distribution corresponding to the predicted structured data and a specified data distribution is acquired. The node distribution is used for indicating the distribution of node feature vectors of the predicted structured data in the feature space, the divergence data is used for indicating a difference between the node distribution and the specified data distribution. The training loss value is obtained based on the distance measure data and the divergence data. That is, the feature similarity of the sample structured data and the predicted structured data is indicated according to the distance measure data of the sample structured data and the predicted structured data in the feature space, and the training loss value is determined according to the feature similarity and the divergence between the node distribution of the predicted structured data and the specified data distribution, so that the model is trained from two perspectives of the feature difference and the node distribution. During training, the prediction accuracy of the model for the structured data is improved, and moreover, the node distribution is fitted to the specified data distribution as much as possible to facilitate downstream sampling of the specified data distribution and generation of corresponding reconstructed structured data, so that the diversity of the generated reconstructed structured data is improved.

The training loss value is calculated according to a specified loss function. In some embodiments, the specified loss function may be a loss function such as a mean absolute error loss function, a negative log-likelihood loss function, an exponential loss function, a cross-entropy loss function, or a variant thereof.

In some embodiments, the foregoing distance measure data may be a Euclidean distance, a Hamming distance, a cosine measure, a Manhattan distance, a Chebyshev distance, or the like between the sample structured data and the predicted structured data in the feature space, which is not defined here.

In one example, the specified loss function used for determining the training loss value is represented by formula VIII, where, $R_{q(Z|X,A)}[\log p(A|X)]$ is a cross-entropy loss function of a structure feature and a node feature, $p(Z)$ is represented by formula IX, and $KL_{(\ )}$ is a Kullback-Leibler divergence function.

$$L = R_{q(Z|X,A)}[\log p(A|X)] - KL[q(Z|A)\|p(Z)] \quad \text{(Formula VIII)}$$

$$p(Z) = \Pi_i N(0, I) \quad \text{(Formula IX)}$$

Exemplarily, based on the matching of the calculated training loss value and a preset specified loss threshold failing, the whole model is trained by adjusting model parameters of the training model, so that the to-be-trained decoder converges as the model converges. The parameters of the foregoing training model include model parameters of the encoder and model parameters of the decoder.

Operation 7032: Obtain a prediction model in response to the training loss value of the sample structured data and the predicted structured data reaching the specified loss threshold.

When the training loss value obtained according to the specified loss function reaches the specified loss threshold, it is determined that the training of the whole training model is completed, that is, the prediction model is obtained. A decoder part in the prediction model is the specified decoder. In one example, during training, an outputted predicted structured data and the inputted sample structured data need to be as close as possible. Therefore, it is determined that the training of the training model is completed to obtain the prediction model in response to the training loss value of the sample structured data and the predicted structured data being less than the specified loss threshold.

In some embodiments, the prediction model obtained by training may be stored in a server, and is invoked by a terminal through a generation request. That is, when the terminal transmits the generation request to the server, the server invokes the prediction model to generate reconstructed structured data, and returns back the generated reconstructed structured data to the terminal. Or, the prediction model generated by training may be transmitted by the server to the terminal, and the terminal uses the prediction model to generate reconstructed structured data.

In some embodiments, during application, reconstructed structured data may be generated through the complete prediction model. Exemplarily, candidate structured data is inputted into the prediction model, and the prediction model performs encoding to obtain a hidden-layer feature representation and then performs decoding for structure reconstruction to obtain a reconstructed structured data with a structure similar to that of the candidate structured data. This method may be applied to scenarios where structured data with a high similarity to a specified structure is required to be generated. Or, during application, only the specified decoder in the prediction model is used to generate reconstructed structured data. That is, candidate data in a specified data distribution is sampled to obtain sampled data, the sampled data is taken as an input of the specified decoder, and the specified decoder performs structure reconstruction according to the sampled data to obtain corresponding reconstructed structured data. The method may be applied to scenarios where reconstructed structured data with unknown properties is required to be generated, which can ensure the rationality of generated structures and improve the diversity of the generated structures.

Based on the above, according to the decoder training method provided in the embodiments of the disclosure, structure reconstruction is performed on an acquired hidden-layer feature representation through a decoder to obtain corresponding predicted structured data, and the whole training model is trained according to a difference between the predicted structured data and sample structured data, so that the training process of the decoder is realized. The decoder recovers, in compliance with the inverse process of the wavelet transform, the high-frequency characteristics that are compressed and reduced in a hidden layer, so that reconstruction of high-frequency signals and denoising are realized. In this way, a problem that after the GCN is adopted for filtering, accuracy accumulation effect (the final accuracy is in directly proportional to an $N^{th}$ power of the model prediction accuracy) is produced as data is subjected to secondary smoothing due to direct reconstruction through a GCN is avoided. That is, the problem of low diversity and low generation rate of generated structured data caused by continuous reduction of the prediction accuracy in the decoding process after reduction in the encoding process is solved, so that the accuracy of reconstruction results of the decoder during application is improved.

Exemplarily, the foregoing decoder training method is applied to a scenario where a chemical molecule is generated, when a new chemical molecule is obtained by reconstructing atom types, the high-frequency characteristics that are compressed and reduced in the hidden layer are recovered. Compared with the direct reconstruction method through a GCN, a reconstruction root mean squared error (RMSE) corresponding to the method of the disclosure may be reduced by about 10%. The atom types and prediction of a graph structure ensure the reconstruction accuracy. That is, the property stability of a newly generated chemical molecule can be greatly improved to ensure the validity of the newly generated chemical molecule.

Figure 8:
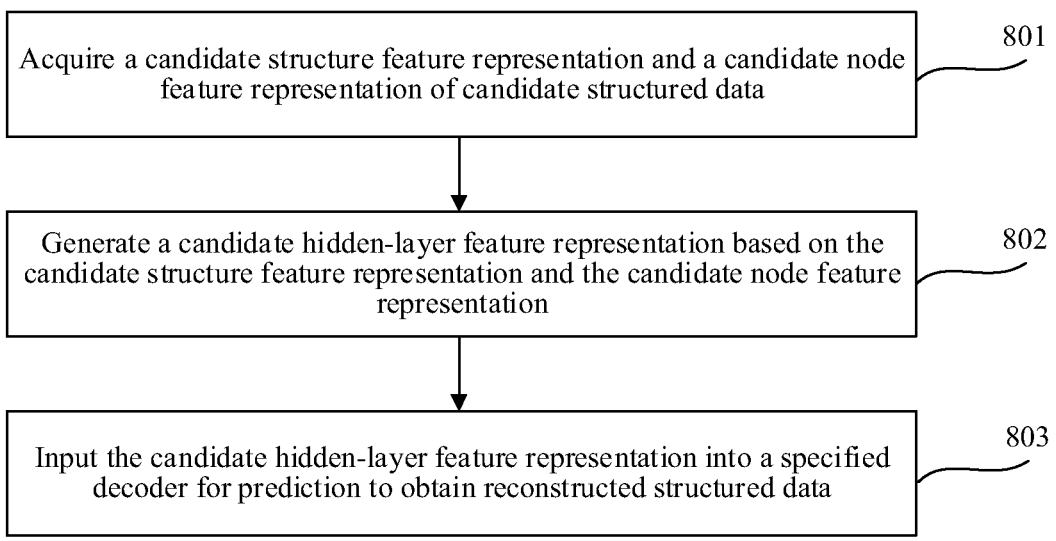
FIG. 8 is a flowchart of a structured data generation method according to another embodiment of the disclosure.

Referring to FIG. 8, which shows a structured data generation method according to some embodiments of the disclosure, an application of a prediction model obtained by training is exemplarily described, and in the embodiments of the disclosure, reconstructed structured data is generated through the prediction model obtained by training. The method includes the following operations.

Operation 801: Acquire a candidate structure feature representation and a candidate node feature representation of candidate structured data.

Exemplarily, the foregoing candidate structured data is data for generating similar structured data and is data whose data structure is a graph structure, that is, the candidate structured data is data composed of at least two nodes and at least one side. In some embodiments, the foregoing graph structure may be any graph structure such as an undirected graph, a directed graph, an undirected complete graph, and a directed complete graph, and a specific graph structure may be determined according to data information corresponding to the candidate structured data.

In one example, the prediction module is configured to generate a chemical molecule, and the foregoing candidate structured data corresponds to a candidate chemical molecule, that is, atoms in the molecule are nodes in a graph, and chemical bonds between the atoms are sides in the graph. Exemplarily, a corresponding candidate molecule graph is generated according to a chemical structure of the candidate chemical molecule, and is taken as the candidate structured data, and the candidate structure feature representation and the candidate node feature representation may be obtained according to the candidate molecule graph. The candidate structure feature representation is an adjacency matrix recording the connection between the atoms in the candidate chemical molecule, and the candidate node feature representation is a matrix recording atom types of the atoms constituting the candidate chemical molecule.

Operation 802: Generate a candidate hidden-layer feature representation based on the candidate structure feature representation and the candidate node feature representation.

Exemplarily, the candidate structure feature representation and the candidate node feature representation are encoded through a specified encoder in the prediction model to obtain intermediate encoded data, and the intermediate encoded data is aggregated to obtain the candidate hidden-layer feature representation. In the embodiments of the disclosure, the intermediate encoded data is data obtained by performing intermediate computing on features encoded by the specified encode, that is, the data obtained by intermediate computing is a mean value and a variance.

Node feature vectors in a feature space respectively corresponding to the nodes in the candidate structured data on at least two frequency bands are acquired based on the candidate structure feature representation and the candidate node feature representation, and mean value data and variance data of the node feature vectors corresponding to the at least two frequency bands are acquired and determined as the intermediate encoded data. After the mean value data and the variance data are determined, the hidden-layer feature representation is calculated by a reparameterization technique, and a specific determination process is the same as operations 402 and 403 and is a data processing process in the application phase in this embodiment, which is not described in detail here.

Operation 803: Input the candidate hidden-layer feature representation into a specified decoder for prediction to obtain reconstructed structured data.

The foregoing reconstructed structured data has structural properties similar to those of the candidate structured data.

Exemplarily, the candidate hidden-layer feature representation is inputted into the specified decoder, structure reconstruction is performed on the hidden-layer feature representation through the specified decoder to obtain a reconstructed structure feature representation and a reconstructed node feature representation, and the reconstructed structured data is obtained according to the reconstructed structure feature representation and the reconstructed node feature representation. Specifically, a case where the candidate structured data is a candidate molecule graph corresponding to a candidate chemical molecule is taken as an example, the reconstructed structured data obtained by prediction is a candidate molecule structure that has chemical properties similar to those of the inputted candidate chemical molecule. Based on an application scenario being smart healthcare, there is a high probability of drug similarity between the candidate molecular structure and the inputted candidate chemical molecule, so that the candidate molecular structure may assist in the research of alternative drugs or the research process of drug optimization.

Based on the above, according to the structured data generation method provided in the embodiments of the disclosure, inputted candidate structured data is encoded and reconstructed through a complete prediction model obtained by training to generate new structured data with structural properties similar to those of the candidate structured data. The prediction model is a model adopting wavelet encoding and decoding, which realizes the reconstruction of high-frequency signals and denoising, improves the accuracy of reconstructed structured data obtained by reconstruction, and ensures a structural property similarity between inputted and outputted structured data; and therefore, the prediction model may be applied to generation of similar structured data.

Figure 9:
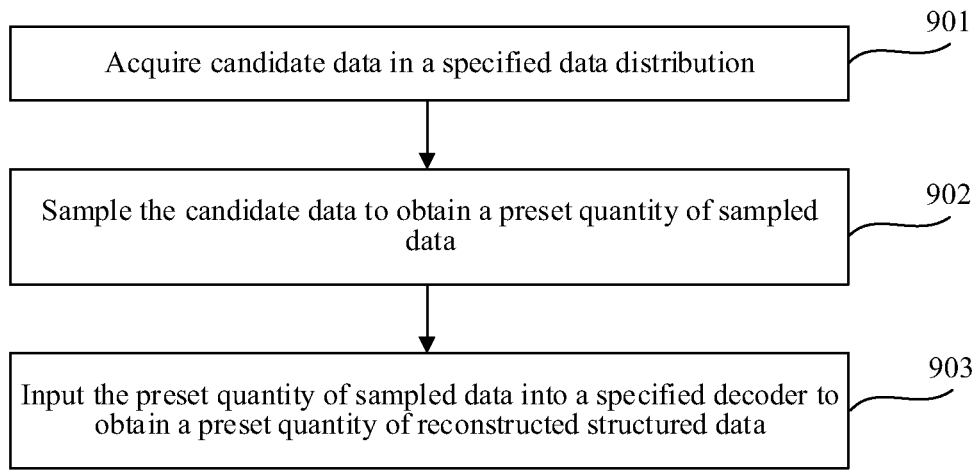
FIG. 9 is a flowchart of a structured data generation method according to another embodiment of the disclosure.

Referring to FIG. 9, which shows a structured data generation method according to some embodiments of the disclosure, an application of a specified decoder obtained by training is exemplarily described, and in the embodiments of the disclosure, reconstructed structured data is generated through the specified decoder obtained by training. The method includes the following operations.

Operation 901. Acquire candidate data in a specified data distribution.

In the embodiments of the disclosure, after a prediction model is trained, a specified decoder is separated from the prediction model and applied as a model configured to generate reconstructed structured data. The foregoing specified data distribution may be a Gaussian distribution, and the candidate data may be customized candidate data that is inputted by a terminal, or may be curve data of structural properties corresponding to a structure generation task after the prediction model is trained to be convergent. The foregoing structure generation task is a task corresponding to the prediction model, that is, the foregoing curve data is data obtained by learning sample structured data in a training set. In some embodiments, the foregoing candidate data may also be candidate data that is generated according to mean value data and variance data obtained by encoding inputted candidate structured data.

Operation 902: Sample the candidate data to obtain a preset quantity of sampled data.

Exemplarily, the candidate data is randomly sampled to obtain the preset quantity of sampled data. The foregoing preset quantity is a quantity of reconstructed structured data that needs to be generated by the specified decoder according to an instruction of the terminal. The foregoing sampled data obtained by sampling is used for indicating a hidden-layer representation between nodes and sides in to-be-generated reconstructed structured data. A quantity of corresponding nodes in each piece of sampled data may be randomly generated or specified, and quantities of nodes in the preset quantity of sampled data may be the same or different. In one example, sampling is performed according to formula X to obtain sampled data Z to be inputted into the specified decoder, where, $N(0,I)$ represents candidate data complying with a normal distribution.

$$P(Z)=N(0,I) \quad \text{(Formula X)}$$

Operation 903: Input the preset quantity of sampled data into the specified decoder to obtain a preset quantity of reconstructed structured data.

After sampled data Z obtained by sampling is inputted into the specified decoder, the specified decoder will perform node prediction on the sampled data, reconstruct a structure feature representation and a node feature representation corresponding to the reconstructed structured data according to probabilities of existence of sides between nodes, and obtain the reconstructed structured data according to the structure feature representation and the node feature representation.

In one example, the specified decoder is configured to generate a chemical molecule, that is, a candidate molecule structure is generated through the specified decoder. The candidate molecule structure is composed of at least two atom nodes. Exemplarily, the preset quantity of sampled data is inputted into the specified decoder, and a preset quantity of candidate molecule structures are obtained through the specified decoder according to the connection between the atom nodes in the molecule structure that is learned during training. That is, the specified decoder can generate candidate molecule structures satisfying chemical rules according to the sampled data. The foregoing preset quantity of generated molecule structures have certain validity, that is, the molecule structures are valid according to the chemical rules, and assist in generating lead compounds.

Based on the above, according to the structured data generation method provided in the embodiments of the disclosure, candidate data in a specified data distribution is sampled to obtain a certain quantity of sampled data, and the sampled data is inputted into a specified decoder for structure reconstruction to obtain reconstructed structured data with certain validity, so that the diversity of the generated reconstructed structured data is improved.

Exemplarily, the structured data generation method according to the embodiments of the disclosure is applied to the disclosed data set ZINC for test, a specified decoder is obtained by training, and new chemical molecules are generated through the specified decoder. During generation of the new chemical molecules, data $N(0,I)$ in a normal distribution is randomly sampled 104 times, and a sampling result is inputted into the specified decoder obtained by training to obtain 104 newly generated chemical molecules. The obtained new chemical molecules are verified through the open source platform rdkit, and it can be determined that the new chemical molecules have certain validity and high uniqueness and novelty. The validity reaches 98.0%, the uniqueness reaches 99.1%, and the novelty reaches 96.5%. The high uniqueness and novelty indicate high diversity of generated molecules. On the whole, it can be seen that the diversity of generated molecules is improved, so the generation space can be enlarged.

It is worthwhile to note that when the foregoing embodiments of the disclosure are applied to a specific product or technology, and user data (for example, the method is applied to a recommendation system) is involved, the acquisition of data requires user's permission or consent. Moreover, both the research of compounds and the use and processing of data need to comply with relevant laws and regulations and standards of relevant countries and regions.

Figure 10:
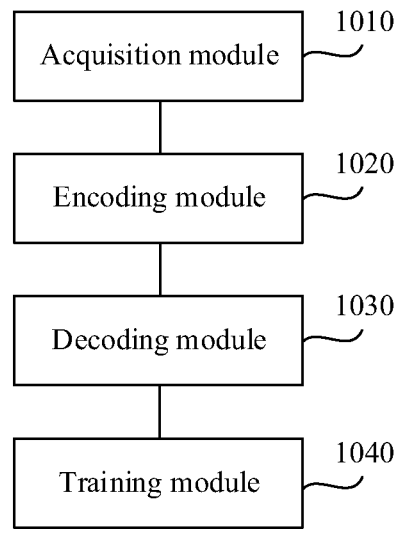
FIG. 10 is a structural block diagram of a structured data generation apparatus according to an embodiment of the disclosure.

Referring to FIG. 10, which is a structural block diagram of a structured data generation apparatus according to an embodiment of the disclosure, the apparatus includes the following modules:

an acquisition module 1010, configured to acquire a structure feature representation and a node feature representation of sample structured data, the structure feature representation indicates the connection between nodes constituting the sample structured data, and the node feature representation indicates node types corresponding to the nodes constituting the sample structured data;

an encoding module 1020, configured to generate a hidden-layer feature representation based on the structure feature representation and the node feature representation, the hidden-layer feature representation indicates the combination of the nodes in the sample structured data on at least two frequency bands;

a decoding module 1030, configured to input the hidden-layer feature representation into a to-be-trained decoder for structure reconstruction to obtain predicted structured data; and a training module 1040, configured to train the to-be-trained decoder based on the predicted structured data to obtain a specified decoder, the specified decoder being configured to perform structure reconstruction on inputted sampled data to obtain reconstructed structured data, and the sampled data being data obtained by sampling candidate data.

Figure 11:
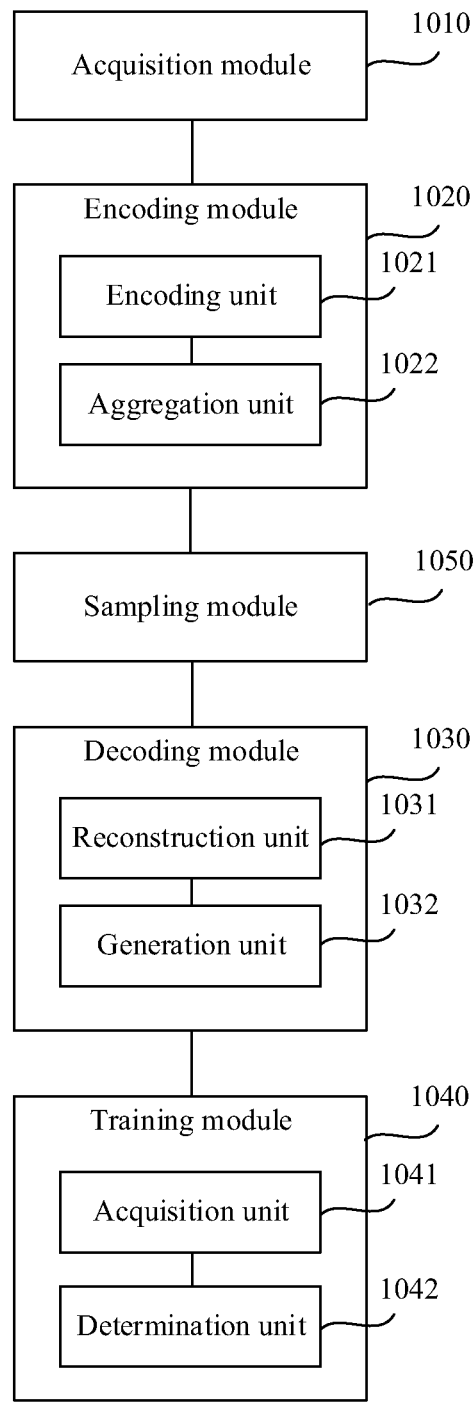
FIG. 11 is a structural block diagram of a structured data generation apparatus according to an embodiment of the disclosure.

In some optional embodiments, as shown in FIG. 11, the encoding module 1020 further includes:

an encoding unit 1021, configured to respectively encode the structure feature representation and the node feature representation on the at least two frequency bands to obtain intermediate feature data, the intermediate feature data indicates the combination of the nodes in the sample structured data on corresponding frequency bands; and an aggregation unit 1022, configured to aggregate the intermediate feature data respectively corresponding to the at least two frequency bands based on a specified data distribution to obtain the hidden-layer feature representation, the candidate data being data satisfying the specified data distribution.

In some optional embodiments, the encoding unit 1021 is further configured to: input the structure feature representation and the node feature representation into a to-be-trained encoder. Based on the structure feature representation and the node feature representation being taken as known conditions, the to-be-trained encoder determines connection probability of establishing connection relationships between an $i^{th}$ predicted node in a predicted node set and predicted nodes in the predicted node set, determines a connection probability distribution corresponding to the $i^{th}$ predicted node according to the connection probabilities of the $i^{th}$ predicted node and the predicted nodes, and determines the intermediate feature data respectively corresponding to the at least two frequency bands according to a fusion result of connection probability distributions of all predicted nodes in the predicted node set. The predicted nodes are used for constructing the predicted structured data, and i is a positive integer.

In some optional embodiments, the encoding unit 1021 is further configured to acquire node feature vectors in a feature space respectively corresponding to the nodes in the sample structured data on the at least two frequency bands based on the structure feature representation and the node feature representation; acquire mean value data and variance data of the node feature vectors corresponding to the at least two frequency bands; and determine the mean value data and the variance data as the intermediate feature data.

In some optional embodiments, the decoding module 1030 further includes:

a reconstruction unit 1031, configured to perform structure reconstruction on the hidden-layer feature representation through the to-be-trained decoder to acquire a decoded structure feature representation and a decoded node feature representation; and a generation unit 1032, configured to generate the predicted structured data based on the decoded structure feature representation and the decoded node feature representation.

In some optional embodiments, the apparatus further includes:

a training module 1040, configured to obtain a training loss value based on a structure difference between the sample structured data and the predicted structured data, determine that the training of the to-be-trained decoder is completed and the specified decoder is obtained in response to the training loss value reaching a specified loss threshold; or, iteratively train model parameters of the to-be-trained decoder in response to matching failure of the training loss value and the specified loss threshold.

In some optional embodiments, the training module 1040 further includes:

an acquisition unit 1041, configured to acquire distance measure data of the sample structured data and the predicted structured data in the feature space, the acquisition unit 1041 being further configured to acquire divergence data of a node distribution corresponding to the predicted structured data and the specified data distribution, the node distribution indicates the distribution of the node feature vectors of the predicted structured data in the feature space; and a determination unit 1042, configured to obtain the training loss value based on the distance measure data and the divergence data.

In some optional embodiments, the acquisition module 1010 is further configured to acquire a candidate structure feature representation and a candidate node feature representation of candidate structured data.

The encoding module 1020 is further configured to generate a candidate hidden-layer feature representation based on the candidate structure feature representation and the candidate node feature representation.

The decoding module 1030 is further configured to input the candidate hidden-layer feature representation into the specified decoder for prediction to obtain the reconstructed structured data, the reconstructed structured data having structural properties similar to those of the candidate structured data.

In some optional embodiments, the apparatus further includes:

a sampling module 1050, configured to acquire candidate data in the specified data distribution; and sample the candidate data to obtain a preset quantity of sampled data.

The decoding module 1030 is further configured to input the preset quantity of sampled data into the specified decoder to obtain a preset quantity of reconstructed structured data.

In some optional embodiments, the specified decoder is configured to generate a candidate molecule structure composed of at least two atom nodes.

The decoding module 1030 is further configured to input the preset quantity of sampled data into the specified decoder, and the specified decoder obtains the preset quantity of candidate molecule structures according to the connection of atom nodes in the molecule structure that is learned during training.

In some optional embodiments, when the specified decoder obtained by training is configured to generate a molecule structure, the acquisition module 1010 is further configured to acquire a sample chemical molecule that is composed of at least two atoms and is a known molecule satisfying atom binding criteria; transform the sample chemical molecule into a sample molecule graph whose data structure is a graph structure, nodes in the sample molecule graph indicates the at least two atoms in the sample chemical molecule, and sides in the sample molecule graph indicates chemical bonds between the atoms in the sample chemical molecule; determine an adjacency matrix corresponding to the sample molecule graph as the structure feature representation; and determine a node matrix corresponding to the sample molecule graph as the node feature representation.

Based on the above, the structured data generation apparatus according to the embodiments of the disclosure obtains a hidden-layer feature representation based on a structure feature representation and a node feature representation of sample structured data, and iteratively trains a to-be-trained decoder according to the hidden-layer feature representation to obtain a specified decoder, and the specified decoder generates structured data according to inputted sampled data. That is, diverse structured data may be rapidly generated through the specified decoder obtained by training according to requirements, so that the generation efficiency and generation diversity of structured data are improved.

The structured data generation apparatus according to the foregoing embodiments is only illustrated by the division of the foregoing functional modules. In an actual application, the foregoing functions may be allocated to different functional modules as needed, that is, an internal structure of a device is divided into different functional modules to implement all or some of the foregoing functions. In addition, the structured data generation apparatus according to the foregoing embodiments belongs to the same idea as the structured data generation method, and its specific implementation process may refer to the method embodiments, which is not described in detail here.

Figure 12:
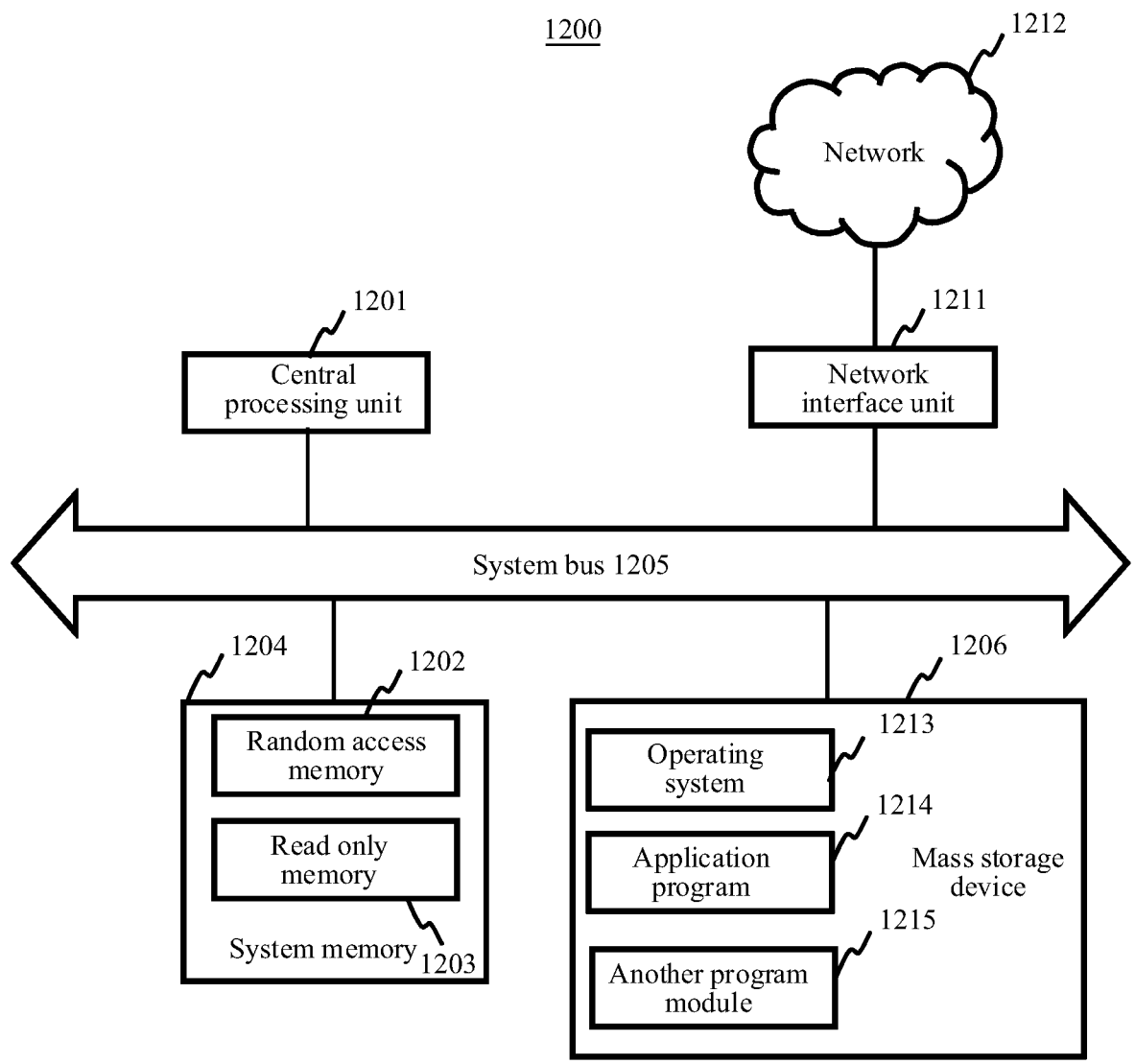
FIG. 12 is a schematic structural diagram of a server according to an embodiment of the disclosure.

FIG. 12 is a schematic structural diagram of a server according to an embodiment of the disclosure. Specifically, the server includes the following structures.

A server 1200 includes a central processing unit (CPU) 1201, a system memory 1204 including a random access memory (RAM) 1202 and a read only memory (ROM) 1203, and a system bus 1205 connecting the system memory 1204 to the CPU 1201. The server 1200 further includes a mass storage device 1206 configured to store an operating system 1213, an application program 1214, and another application module 1215.

The mass storage device 1206 is connected to the CPU 1201 through a mass storage controller (not shown) connected to the system bus 1205. The mass storage device 1206 and a computer-readable medium associated with the mass storage device 1206 provide non-volatile storage for the server 1200.

Without loss of generality, the computer-readable medium may include a computer storage medium and a communication medium. The foregoing system memory 1204 and mass storage device 1206 may be collectively referred to as a memory.

According to the embodiments of the disclosure, the server 1200 may be connected to a network 1212 through a network interface unit 1211 connected to the system bus 1205, or may be connected to other types of networks or a remote computer system (not shown) through the network interface unit 1211.

The memory further includes one or more programs, which are stored in the memory and are configured to be executed by the CPU.

The embodiments of the disclosure further provide a computer device, which includes a processor and a memory. The memory stores at least one instruction, at least one segment of program, a code set or an instruction set that, when loaded and executed by the processor, implements the structured data generation method according to the foregoing method embodiments. In some embodiments, the computer device may be a terminal or a server.

The embodiments of the disclosure further provide a computer-readable storage medium, which stores at least one instruction, at least one segment of program, a code set or an instruction set that, when loaded and executed by a processor, implements the structured data generation method according to the foregoing method embodiments.

The embodiments of the disclosure further provide a computer program product or a computer program, which includes computer instructions. The computer instructions are stored in a computer-readable storage medium. A processor of a computer device reads the computer instructions from the computer-readable storage medium and executes the computer instructions to cause the computer device to perform the structured data generation method according to any one of the foregoing embodiments.

In some embodiments, the computer-readable storage medium may include: a read only memory (ROM), a random access memory (RAM), a solid state drive (SSD), an optical disc, or the like. The RAM may include a resistance random access memory (ReRAM) and a dynamic random access memory (DRAM). In some embodiments, the computer-readable storage medium may be non-transitory. The serial numbers of the foregoing embodiments of the disclosure are for the purpose of description only, and do not represent the superiority and inferiority of the embodiments.

What is claimed is:

1. A method, performed by a computer device, comprising:
    acquiring a structure feature representation and a node feature representation of sample structured data, wherein the structure feature representation indicates the connection between nodes constituting the sample structured data, and wherein the node feature representation indicates node types corresponding to the nodes constituting the sample structured data;
    generating a hidden-layer feature representation based on the structure feature representation and the node feature representation, wherein the hidden-layer feature representation indicates the combination of the nodes in the sample structured data on at least two frequency bands;
    inputting the hidden-layer feature representation into a to-be-trained decoder for structure reconstruction to obtain predicted structured data; and
    training the to-be-trained decoder based on the predicted structured data to obtain a trained decoder; and
    inputting sampled data into the trained decoder and performing, by the trained decoder, structure reconstruction on the inputted sampled data to obtain reconstructed structured data.

2. The method according to claim 1, wherein the generating comprises:
    respectively encoding the structure feature representation and the node feature representation on the at least two frequency bands to obtain intermediate feature data, wherein the intermediate feature data indicates the combination of the nodes in the sample structured data on the corresponding frequency bands; and
    aggregating the intermediate feature data respectively corresponding to the at least two frequency bands based on a specified data distribution to obtain the hidden-layer feature representation, the candidate data being data satisfying the specified data distribution.

3. The method according to claim 2, wherein the respectively encoding comprises:

inputting the structure feature representation and the node feature representation into a to-be-trained encoder, so that the encoder determines, based on the structure feature representation and the node feature representation being taken as known conditions, connection probabilities of establishing connection relationships between an $i^{th}$ predicted node in a predicted node set and predicted nodes in the predicted node set, determines a connection probability distribution corresponding to the $i^{th}$ node according to the connection probabilities of the $i^{th}$ predicted node and the predicted nodes, and determines the intermediate feature data respectively corresponding to the at least two frequency bands according to a fusion result of connection probability distributions of all predicted nodes in the predicted node set, wherein the predicted nodes construct the predicted structured data, and i being a positive integer.

4. The method according to claim 2, wherein the respectively encoding comprises:
acquiring node feature vectors in a feature space of the nodes in the sample structured data on the at least two frequency bands based on the structure feature representation and the node feature representation;
acquiring mean value data and variance data of the node feature vectors corresponding to the at least two frequency bands; and
determining the mean value data and the variance data as the intermediate feature data.

5. The method according to claim 1, wherein the inputting the hidden-layer feature representation comprises:
performing structure reconstruction on the hidden-layer feature representation through the to-be-trained decoder to acquire a decoded structure feature representation and a decoded node feature representation; and
generating the predicted structured data based on the decoded structure feature representation and the decoded node feature representation.

6. The method according to claim 1, wherein the training the to-be-trained decoder comprises:
obtaining a training loss value based on a structure difference between the sample structured data and the predicted structured data, including:
acquiring distance measure data of the sample structured data and the predicted structured data in the feature space;
acquiring divergence data of a node distribution of the predicted structured data and the specified data distribution, wherein the node distribution indicates the distribution of node feature vectors of the predicted structured data in the feature space, and wherein the divergence data indicates a difference between the node distribution and the specified data distribution; and
obtaining the training loss value based on the distance measure data and the divergence data; and
determining that the training of the to-be-trained decoder is completed and the specified decoder is obtained in response to the training loss value reaching a specified loss threshold; or, iteratively training model parameters of the to-be-trained decoder in response to matching failure of the training loss value and the specified loss threshold.

7. The method according to claim 1, further comprising:
acquiring a candidate structure feature representation and a candidate node feature representation of candidate structured data;
generating a candidate hidden-layer feature representation based on the candidate structure feature representation and the candidate node feature representation;
inputting the candidate hidden-layer feature representation into the specified decoder for prediction to obtain the reconstructed structured data, the reconstructed structured data having structural properties similar to those of the candidate structured data.

8. The method according to claim 1, further comprising:
acquiring candidate data in a specified data distribution;
sampling the candidate data to obtain a preset quantity of sampled data; and
inputting the preset quantity of sampled data into the specified decoder to obtain a preset quantity of reconstructed structured data.

9. The method according to claim 8, wherein the specified decoder is configured to generate a candidate molecule structure, and the candidate molecule structure is composed of at least two atom nodes; and
the inputting the preset quantity of sampled data into the specified decoder to obtain a preset quantity of reconstructed structured data comprises:
inputting the preset quantity of sampled data into the specified decoder, so that the specified decoder obtains a preset quantity of candidate molecule structures according to connection relationships between atom nodes in the molecule structures that are learned during training.

10. The method according to claim 1, wherein based on the specified decoder obtained by training being configured to generate a molecule structure, before the acquiring a structure feature representation and a node feature representation of sample structured data, the method further comprises:
acquiring a sample chemical molecule, the sample chemical molecule being composed of at least two atoms, the sample chemical molecule being a known molecule satisfying atom binding criteria;
transforming the sample chemical molecule into a sample molecule graph whose data structure is a graph structure, wherein nodes in the sample molecule graph indicate the at least two atoms in the sample chemical molecule, and wherein sides in the sample molecule graph indicate chemical bonds between the atoms in the sample chemical molecule;
determining an adjacency matrix corresponding to the sample molecule graph as the structure feature representation; and
determining a node matrix corresponding to the sample molecule graph as the node feature representation.

11. A apparatus, comprising:
at least one memory configured to store program code; and
at least one processor configured to read the program code and operate as instructed by the program code, the program code comprising:
acquisition code configured to cause the at least one processor to acquire a structure feature representation and a node feature representation of sample structured data, wherein the structure feature representation indicates the connection between nodes constituting the sample structured data, and wherein the node feature representation indicates node types corresponding to the nodes constituting the sample structured data;

encoding code configured to cause the at least one processor to generate a hidden-layer feature representation based on the structure feature representation and the node feature representation, wherein the hidden-layer feature representation indicates the combination of the nodes in the sample structured data on at least two frequency bands;

decoding code configured to cause the at least one processor to input the hidden-layer feature representation into a to-be-trained decoder for structure reconstruction to obtain predicted structured data;

training code configured to cause the at least one processor to train the to-be-trained decoder based on the predicted structured data to obtain a specified decoder, and input sampled data into the trained decoder and perform, by the trained decoder, structure reconstruction on the inputted sampled data to obtain reconstructed structured data.

12. The apparatus according to claim 11, wherein the generating a hidden-layer feature representation comprises:

respectively encoding the structure feature representation and the node feature representation on the at least two frequency bands to obtain intermediate feature data, wherein the intermediate feature data indicates the combination of the nodes in the sample structured data on the corresponding frequency bands; and aggregating the intermediate feature data respectively corresponding to the at least two frequency bands based on a specified data distribution to obtain the hidden-layer feature representation, the candidate data being data satisfying the specified data distribution.

13. The apparatus according to claim 12, wherein the respectively encoding comprises:

inputting the structure feature representation and the node feature representation into a to-be-trained encoder, so that the encoder determines, based on the structure feature representation and the node feature representation being taken as known conditions, connection probabilities of establishing connection relationships between an $i^{th}$ predicted node in a predicted node set and predicted nodes in the predicted node set, determines a connection probability distribution corresponding to the $i^{th}$ node according to the connection probabilities of the $i^{th}$ predicted node and the predicted nodes, and determines the intermediate feature data respectively corresponding to the at least two frequency bands according to a fusion result of connection probability distributions of all predicted nodes in the predicted node set, the predicted nodes being used for constructing the predicted structured data, and i being a positive integer.

14. The apparatus according to claim 12, wherein the respectively encoding comprises:

acquiring node feature vectors in a feature space of the nodes in the sample structured data on the at least two frequency bands based on the structure feature representation and the node feature representation;

acquiring mean value data and variance data of the node feature vectors corresponding to the at least two frequency bands; and determining the mean value data and the variance data as the intermediate feature data.

15. The apparatus according to claim 11, wherein the inputting the hidden-layer feature representation comprises:

performing structure reconstruction on the hidden-layer feature representation through the to-be-trained decoder to acquire a decoded structure feature representation and a decoded node feature representation; and generating the predicted structured data based on the decoded structure feature representation and the decoded node feature representation.

16. The apparatus according to claim 11, wherein the training the to-be-trained decoder comprises:

obtaining a training loss value based on a structure difference between the sample structured data and the predicted structured data, including:

acquiring distance measure data of the sample structured data and the predicted structured data in the feature space;

acquiring divergence data of a node distribution of the predicted structured data and the specified data distribution, wherein the node distribution indicates the distribution of node feature vectors of the predicted structured data in the feature space, and wherein the divergence data indicates a difference between the node distribution and the specified data distribution; and obtaining the training loss value based on the distance measure data and the divergence data; and determining that the training of the to-be-trained decoder is completed and the specified decoder is obtained in response to the training loss value reaching a specified loss threshold; or, iteratively training model parameters of the to-be-trained decoder in response to matching failure of the training loss value and the specified loss threshold.

17. The apparatus according to claim 11, the program code further comprising:

structure acquiring code configured to cause the at least one processor to acquire a candidate structure feature representation and a candidate node feature representation of candidate structured data;

feature generating code configured to cause the at least one processor to generate a candidate hidden-layer feature representation based on the candidate structure feature representation and the candidate node feature representation;

feature inputting code configured to cause the at least one processor to input the candidate hidden-layer feature representation into the specified decoder for prediction to obtain the reconstructed structured data, the reconstructed structured data having structural properties similar to those of the candidate structured data.

18. The apparatus according to claim 11, wherein the decoding code is further configured to generate a candidate molecule structure, and the candidate molecule structure is composed of at least two atom nodes, the program code comprising:

candidate data acquiring code configured to cause the at least one processor to acquire candidate data in a specified data distribution;

sampling code configured to cause the at least one processor to sample the candidate data to obtain a preset quantity of sampled data; and data inputting code configured to cause the at least one processor to input the preset quantity of sampled data into the specified decoder to obtain a preset quantity of reconstructed structured data, wherein the inputting includes inputting the preset quantity of sampled data into the specified decoder, so that the specified decoder obtains a preset quantity of candidate molecule structures according to connection relationships between atom nodes in the molecule structures that are learned during training.

19. The apparatus according to claim 11, the program code further comprising chemical acquiring code, transforming code, adjacency determining code, and matrix determining code, wherein based on the specified decoder obtained by training being configured to generate a molecule structure, before the acquiring a structure feature representation and a node feature representation of sample structured data, and wherein:

the chemical acquiring code causes the at least one processor to acquire a sample chemical molecule, the sample chemical molecule being composed of at least two atoms, the sample chemical molecule being a known molecule satisfying atom binding criteria;

the transforming code causes the at least one processor to transform the sample chemical molecule into a sample molecule graph whose data structure is a graph structure, wherein nodes in the sample molecule graph indicates the at least two atoms in the sample chemical molecule, and wherein sides in the sample molecule graph indicate chemical bonds between the atoms in the sample chemical molecule;

the adjacency determining code causes the at least one processor to determine an adjacency matrix corresponding to the sample molecule graph as the structure feature representation; and the matrix determining code causes the at least one processor to determine a node matrix corresponding to the sample molecule graph as the node feature representation.

20. A non-transitory computer-readable medium storing computer code that when executed by at least one processor causes the processor to:

acquire a structure feature representation and a node feature representation of sample structured data, wherein the structure feature representation indicates the connection between nodes constituting the sample structured data, and wherein the node feature representation indicates node types corresponding to the nodes constituting the sample structured data;

generate a hidden-layer feature representation based on the structure feature representation and the node feature representation, wherein the hidden-layer feature representation indicates the combination of the nodes in the sample structured data on at least two frequency bands;

input the hidden-layer feature representation into a to-be-trained decoder for structure reconstruction to obtain predicted structured data;

train the to-be-trained decoder based on the predicted structured data to obtain a trained decoder; and input sampled data into the trained decoder and perform, by the trained decoder, structure reconstruction on the inputted sampled data to obtain reconstructed structured data.

* * * * *